US008625594B2

(12) United States Patent
Safrai et al.

(10) Patent No.: US 8,625,594 B2
(45) Date of Patent: Jan. 7, 2014

(54) SWITCHING APPARATUS AND METHOD BASED ON VIRTUAL INTERFACES

(75) Inventors: Uri Safrai, Haifa (IL); David Melman, Bikat Beit Hakerem (IL); Tsahi Daniel, Palo Alto, CA (US); Nafea Bishara, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 467 days.

(21) Appl. No.: 12/938,116

(22) Filed: Nov. 2, 2010

(65) Prior Publication Data

US 2011/0134925 A1 Jun. 9, 2011

Related U.S. Application Data

(60) Provisional application No. 61/257,406, filed on Nov. 2, 2009.

(51) Int. Cl.
*H04L 12/28* (2006.01)
(52) U.S. Cl.
USPC .......................................... 370/392; 370/400
(58) Field of Classification Search
USPC .................................. 370/395, 530
See application file for complete search history.

(56) References Cited

U.S. PATENT DOCUMENTS

| | | | | |
|---|---|---|---|---|
| 6,185,188 B1 * | 2/2001 | Hasegawa | ...................... | 370/235 |
| 6,859,835 B1 * | 2/2005 | Hipp | .............................. | 709/227 |
| 6,985,956 B2 * | 1/2006 | Luke et al. | ..................... | 709/229 |
| 7,467,191 B1 * | 12/2008 | Wang et al. | .................... | 709/221 |
| 7,574,202 B1 | 8/2009 | Tsao et al. | | |
| 7,796,594 B2 | 9/2010 | Melman et al. | | |
| 8,234,361 B2 * | 7/2012 | Krywaniuk | .................... | 709/223 |
| 8,320,255 B2 * | 11/2012 | Vasseur et al. | ................ | 370/238 |
| 2003/0212830 A1 | 11/2003 | Greenblat et al. | | |
| 2004/0015599 A1 | 1/2004 | Trinh et al. | | |
| 2004/0044744 A1 * | 3/2004 | Grosner et al. | ............... | 709/217 |
| 2004/0252722 A1 | 12/2004 | Wybenga et al. | | |
| 2005/0232303 A1 * | 10/2005 | Deforche et al. | ............. | 370/469 |

(Continued)

FOREIGN PATENT DOCUMENTS

EP 1885139 A1 2/2008

OTHER PUBLICATIONS

International Search Report and Written Opinion for International Application No. PCT/US2010/055115, dated Jan. 27, 2011.

(Continued)

*Primary Examiner* — Andrew Lee

(57) ABSTRACT

A network device comprises a plurality of physical ports, and a packet processing pipeline coupled to the plurality of physical ports. The packet processing pipeline is configured to assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port. The packet processing pipeline is also configured to assign a virtual domain from a plurality of virtual domains to the packet based on the assigned virtual port, and process the packet based on one or more of i) the assigned virtual port, ii) the assigned virtual domain, and iii) a header field of the packet, including determining zero, one, or more physical ports to which the packet is to be forwarded.

40 Claims, 9 Drawing Sheets

(56) References Cited

U.S. PATENT DOCUMENTS

| | | | |
|---|---|---|---|
| 2006/0002386 A1 | 1/2006 | Yik et al. | |
| 2006/0230185 A1 | 10/2006 | Errickson et al. | |
| 2007/0266173 A1* | 11/2007 | Wong et al. | 709/238 |
| 2008/0159277 A1* | 7/2008 | Vobbilisetty et al. | 370/357 |
| 2008/0205403 A1* | 8/2008 | Akyol et al. | 370/392 |
| 2008/0225853 A1 | 9/2008 | Melman et al. | |
| 2008/0232253 A1* | 9/2008 | Wilt et al. | 370/235.1 |
| 2008/0285555 A1* | 11/2008 | Ogasahara | 370/389 |
| 2009/0083445 A1* | 3/2009 | Ganga | 709/250 |
| 2009/0157846 A1 | 6/2009 | Shimozono et al. | |
| 2009/0296579 A1* | 12/2009 | Dharwadkar et al. | 370/235 |
| 2010/0281437 A1* | 11/2010 | Stone-Perez et al. | 715/863 |
| 2011/0007744 A1 | 1/2011 | Melman et al. | |
| 2012/0291117 A1* | 11/2012 | Krywaniuk | 726/15 |

OTHER PUBLICATIONS

International Preliminary Report on Patentability for International Application No. PCT/US2010/055115, dated May 8, 2012.

* cited by examiner

SWITCHING APPARATUS AND METHOD BASED ON VIRTUAL INTERFACES

CROSS-REFERENCE TO RELATED APPLICATION

This application claims the benefit of U.S. Provisional Patent Application No. 61/257,406, entitled "ePORT, eVLAN and L2MLL ARCHITECTURE FOR L2VPN SUPPORT," which was filed on Nov. 2, 2009, the entire disclosure of which is hereby incorporated by reference herein.

FIELD OF THE DISCLOSURE

The present disclosure relates generally to communication networks and, more particularly, to network switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to communicatively couple the servers to outside network connections, such as backbone network links. As another example, a high-volume website server system (server farm) can include a large number of web servers, and switches to communicatively couple the web servers to backbone network links.

In such applications, switching systems capable of switching between a high number of ports are utilized so that traffic from a backbone network line can be routed to a large number of servers, and vice versa. Such switching systems can include a large number of switches, and each switch can be capable of switching between several ports.

With bridge devices, operational characteristics are often defined by various standards such as the IEEE 802.1Q standard or others promulgated by the International Engineering Task Force (IETF), for example. In some instances, carrier Layer-2 VPN (L2VPN) technologies may implement a logical bridge on top of a Layer-2 or Layer-3 infrastructure network; examples of such technologies include VPLS, MAC-in-MAC, and certain emerging wireless local area network (WLAN) standards.

SUMMARY

In one embodiment, a network device comprises a plurality of physical ports, and a packet processing pipeline coupled to the plurality of physical ports. The packet processing pipeline is configured to assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port, The packet processing pipeline is also configured to assign a virtual domain from a plurality of virtual domains to the packet based on the assigned virtual port, and process the packet based on one or more of i) the assigned virtual port, ii) the assigned virtual domain, and iii) a header field of the packet, including determining zero, one, or more physical ports to which the packet is to be forwarded.

In another embodiment, a packet processing method includes receiving a packet via a source physical port from a plurality of physical ports, and assigning a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port. The method also includes assigning a virtual domain from a plurality of virtual domains to the packet based on the assigned virtual port, and processing the packet with a packet processing pipeline based on one or more of i) the assigned virtual port, ii) the assigned virtual domain, and iii) a header field of the packet, including determining zero, one, or more, physical ports to which the packet is to be forwarded.

In yet another embodiment, a network device comprises a plurality of physical ports, and a packet processing pipeline coupled to the plurality of physical ports, the packet processing pipeline comprising plurality of pipeline units. The plurality of pipeline units includes a unit configured to assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port. The plurality of pipeline units also includes one or more units configured to assign a virtual domain from a plurality of virtual domains to the packet based on the assigned virtual port, and one or more downstream units configured to process the packet based on one or more of the assigned virtual port, the assigned virtual domain, and a field of a header of the packet. The one or more downstream units configured to process the packet include one or more forwarding engines to determine zero, one, or more target virtual ports to which the packet is to be forwarded, and one or more units configured to map one or more target virtual ports to which the packet is to be forwarded to one or more physical ports.

In still another embodiment, a network device comprises a plurality of physical ports, and a packet processing pipeline coupled to the plurality of physical ports. The packet processing pipeline is configured to assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port. The packet processing pipeline is additionally configured to assign a virtual domain from a plurality of virtual domains to the packet based on the assigned virtual port, wherein the virtual domain corresponds to a subset of the plurality of virtual ports. Also, the packet processing pipeline is configured to determine an indicator of a set of virtual ports or a set of physical ports to which the packet is to be forwarded based on the assigned virtual domain, and determine whether the indicator corresponds to virtual ports or to physical ports. The packet processing pipeline is configured to duplicate, at a first pipeline unit in the packet processing pipeline, the packet to the set of virtual ports if the indicator corresponds to virtual ports, and map the set of virtual ports to one or more physical ports if the indicator corresponds to virtual ports. Further, the packet processing pipeline is configured to duplicate, at a second pipeline unit in the packet processing pipeline, the packet to the set of physical ports if the indicator corresponds to physical ports, and transmit the packet via one or more physical ports.

In yet another embodiment, a packet processing method includes receiving a packet via a source physical port from a plurality of physical ports, and assigning a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port. Additionally, the method includes assigning a virtual domain from a plurality of virtual domains to the packet based on the assigned virtual port, wherein the virtual domain corresponds to a subset of the plurality of virtual ports, and determining an indicator of a set of virtual ports or a set of physical ports to which the packet is to be forwarded based on the assigned virtual domain. The method also includes determining whether the indicator corresponds to virtual ports or to physical ports, and duplicating, at a first pipeline unit in a packet processing pipeline, the packet to the set of virtual ports if the indicator corresponds to virtual ports; mapping the set of virtual ports to one or more physical ports if the indicator corresponds to virtual ports. Further, the method includes duplicating, at a second pipeline unit in the packet processing pipeline, the packet to the set of physical ports if the indicator corresponds to physical ports, and transmitting the packet via one or more physical ports.

DETAILED DESCRIPTION

Figure 1:
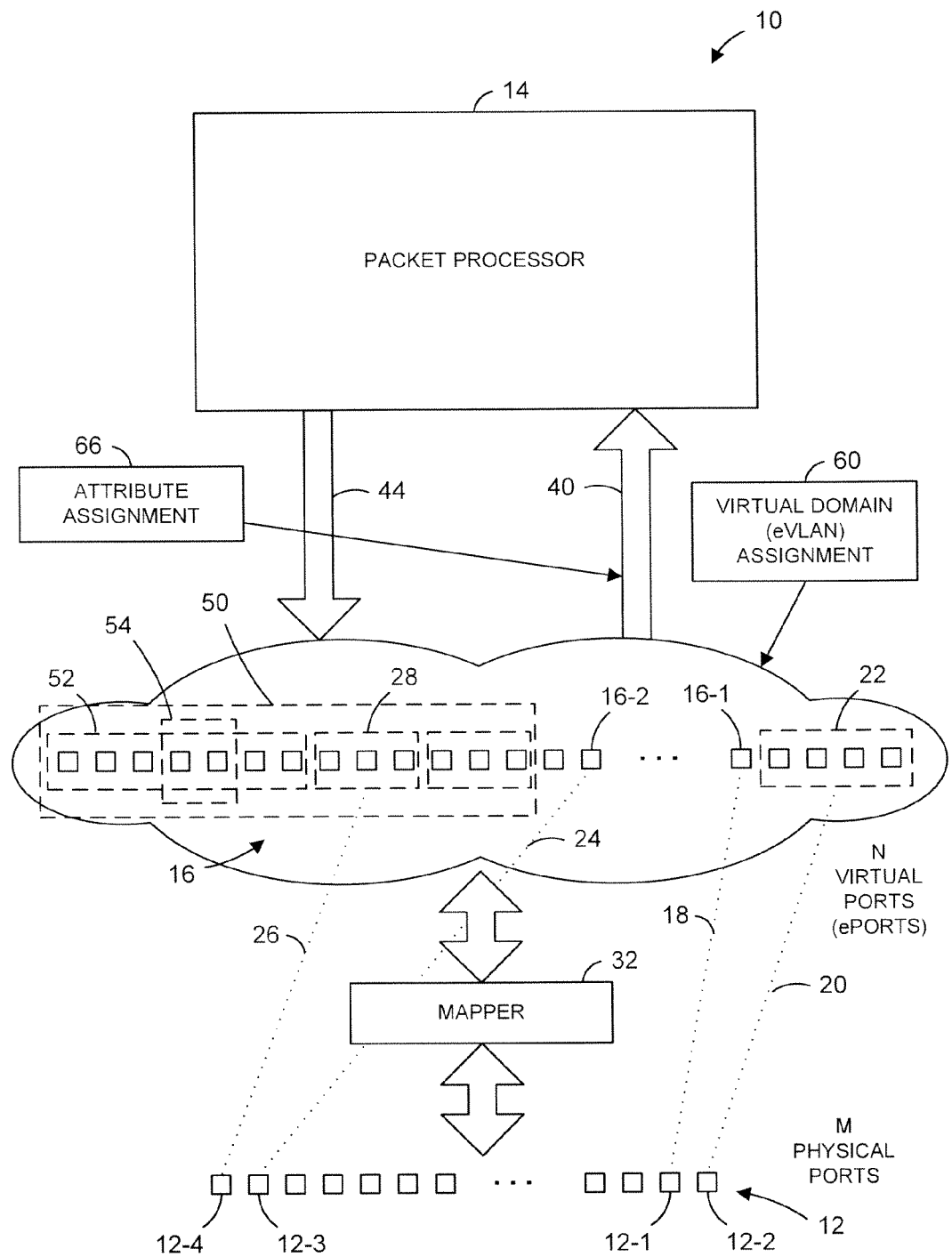
FIG. 1 is a functional diagram of an example network device, in accordance with an embodiment of the disclosure.

FIG. 1 is a functional diagram of an example network device 10 configured for processing and forwarding data units, i.e., packets, according to an embodiment. In some embodiments and/or implementations, the network device 10 operates as a provider edge (PE) device, and the network device 10 is sometimes referred to herein as "the PE device 10". The network device includes a plurality of physical ports 12 and a packet processor 14. The packet processor 14 processes packets ingressing via physical ports 12, including making forwarding decisions (i.e., for egress via physical ports 12), determining whether a packet should be trapped or mirrored to another processor (not shown) for further analysis, determining whether a packet should be discarded, etc.

The network device 10 includes a number M of physical ports 12, and is configured to utilize up to a number N of extended ports 16 (eports), where N>M. In an embodiment, eports are not physical entities, but merely logical assignments. Thus, eports are sometimes referred to herein as "virtual ports."

The network device 10 is configured so that some physical ports 12 correspond to one and only one eport 16, whereas each of other physical ports 12 corresponds to more than one eport 16, in an embodiment. For example, the line 18 indicates that physical port 12-1 corresponds to eport 16-1, whereas the line 20 indicates that the physical port 12-2 corresponds to a group 22 of eports 16. Similarly, the line 24 indicates that physical port 12-3 corresponds to eport 16-2, whereas the line 26 indicates that the physical port 12-4 corresponds to a group 28 of eports 16.

A mapper 32 corresponds physical ports 12 with eports 16. For instance, the mapper maps physical ports 12 to eports 16, and vice versa. For example, as illustrated in FIG. 1, the mapper 32 maps the physical port 12-1 to eport 16-1, and vice versa. Similarly, the mapper 32 maps the physical port 12-2 to the group 22 of eports 16, and vice versa. Also as illustrated in FIG. 1, the mapper 32 maps the physical port 12-3 to eport 16-2, and vice versa. Similarly, the mapper 32 maps the physical port 12-4 to the group 28 of eports 16, and vice versa.

The mapper 32 assigns eports 16 to ingressing packets. Thus, for example, the mapper 32 assigns traffic ingressing on the single physical port 12-2 to different eports 16 in the group 22. In an embodiment, the mapper 32 utilizes information in a packet for determining the eport 16 to which a packet should be assigned, such as header information including tunnel encapsulation information, virtual local area network (VLAN) identifiers, quality of service (QoS) indicators, etc. For instance, the mapper 32 assigns traffic ingressing on the same physical port 12-2 but corresponding to different tunnel interfaces to different eports 16 in the group 22. As another example, the mapper 32 assigns traffic ingressing on the same physical port 12-2 but having different QoS requirements to different eports 16 in the group 22. In an embodiment, the mapper 32 is configured to assign an eport 16 to an ingressing packet by including an indication of the eport 16 in a packet descriptor associated with the packet. In an embodiment, the mapper 32 includes a source eport identifier to the ingressing packet to indicate the eport 16 assigned to the ingressing packet.

Similarly, the mapper 32 assigns physical ports 12 to traffic egressing via eports 16. For instance, the mapper 32 assigns traffic egressing via the group 28 of eports 16 to the same physical port 12-4. As another example, the mapper 32 assigns traffic egressing via eport 16-2 to the physical port 12-3. In an embodiment, the mapper 32 is configured to assign a physical port 12 to an egressing packet by including an indication of the physical port 12 in a packet descriptor associated with the packet. In an embodiment, the mapper 32 includes an egress physical port identifier in the packet descriptor corresponding to the egressing packet to indicate the physical port 12 assigned to the egressing packet. In another embodiment, the mapper 32 directs an egressing packet to a transmit queue memory associated with the physical port 12 assigned to the egressing packet. In an embodiment, such a transmit queue memory stores packets to be transmitted via the associated physical port 12.

Ingressing packets that have been assigned source eports (indicated by the arrow 40) are processed by the packet processor 14. In an embodiment, the packet processor 14 generally determines to which eport or eports 16 (egress eports) an ingressing packet 40 should be forwarded, and then assigns the determined egress eport or eports 16 to the packet. More generally, the packet processor 14 performs a packet forwarding and/or bridging functionality and determines to which eport/s the packet should be forwarded. In an embodiment, the packet processor 14 includes in the packet descriptor an egress eport identifier or an indicator of a set of egress eports 16 to indicate the egress eport(s) 16 assigned to the packet. Egressing packets that have been assigned egress eports (indicated by the arrow 44) are then mapped to physical ports 12 by the mapper 32.

In an embodiment, the network device 10 is configured to associate packets with virtual domains (also referred to herein as "extended virtual local area networks" or "eVLANs"). An eVLAN is similar to a typical VLAN, but corresponds to eports rather than physical ports. In an embodiment, the network device 10 is configured to handle a greater number of eVLANs than the maximum number of VLANs capable of being represented by a 12-bit VLAN identifier specified in the Institute for Electrical and Electronics Engineers (IEEE) 802.11Q Standard.

In an embodiment, an eVLAN corresponds to a group of eports 16. For example, the group 22 of eports 16 is an eVLAN, in an embodiment. Similarly, the group 28 of eports 16 is another eVLAN. In FIG. 1, example eVLANs are indicated by boxes with dashed lines. An eVLAN can include eports corresponding to other eVLANs. For instance, FIG. 1 illustrates an eVLAN 50 including a plurality of eVLANs such as the eVLAN 28, an eVLAN 52, and an eVLAN 54. Additionally, an eVLAN can include a subset of eports of another eVLAN. For example, FIG. 1 illustrates the eVLAN 54 including a subset of the eports 16 of the eVLAN 52.

An eVLAN assignment unit 60 assigns eVLANs to packets. For example, the eVLAN assignment unit 60 assigns an eVLAN to an ingressing packet 40 based on one or more of the source eport 16 assigned to the packet 40 by the mapper 32, information in a header of the packet 40, etc., in some scenarios. As another example, the eVLAN assignment unit 60 assigns an eVLAN to an egressing packet 44 based on one or more of the egress eport 16 assigned to the packet 44 by the packet processor, information in a header of the packet 44, etc., in some scenarios. In an embodiment, the eVLAN assignment unit 60 assigns an eVLAN to a packet by including an eVLAN indicator in the packet descriptor corresponding to the packet.

An attribute assignment unit 66 assigns one or more attributes to a packet based on an eport assigned to the packet and/or an eVLAN assigned to the packet. Attributes are utilized by the packet processor 14 in processing the packet, and the attributes indicate how a packet should be processed by the packet processor 14. Examples of attributes assigned by the attribute assignment unit 66 include 1) whether a packet is to be forwarded; 2) whether a packet is to be trapped, mirrored, etc.; 3) whether the media access control (MAC) source address/ingress eport are to be learned; 4) whether a spanning tree protocol is to be implemented; 5) an action to be taken when a source address of the packet is unknown to the network device 10; 6) whether Layer-3 multicast and/or broadcast mirroring is enabled for the packet; 7) whether and what type of metering should be performed (e.g., dropping a packet due to congestion or when a rate of packets in a particular flow exceeds a threshold); 8) whether and what type of measurements should be made (e.g., incrementing a counter corresponding to a particular flow, counting bytes in the packet, etc.); 9) whether and how sampling should be performed; 10) whether time stamps should be applied; etc., according to various embodiments.

Although in FIG. 1 the mapper 32, the eVLAN assignment unit 60, and the attribute assignment unit 66 are illustrated as being external to the packet processor 14 for the purpose of clarity, in some embodiments, one or more of the mapper 32, the eVLAN assignment unit 60, and the attribute assignment unit 66 are elements of the packet processor 14. Additionally, in some embodiments, each of one or more of the mapper 32, the eVLAN assignment unit 60, and the attribute assignment unit 66 are distributed units that assign data to a packet at different stages of processing of the packet. For example, in one embodiment, the packet processor 14 includes a processing pipeline, and each of one or more of the mapper 32, the eVLAN assignment unit 60, and the attribute assignment unit 66 are distributed over different stages of the processing pipeline and assign data to packets at the different stages of the pipeline.

Figure 2:
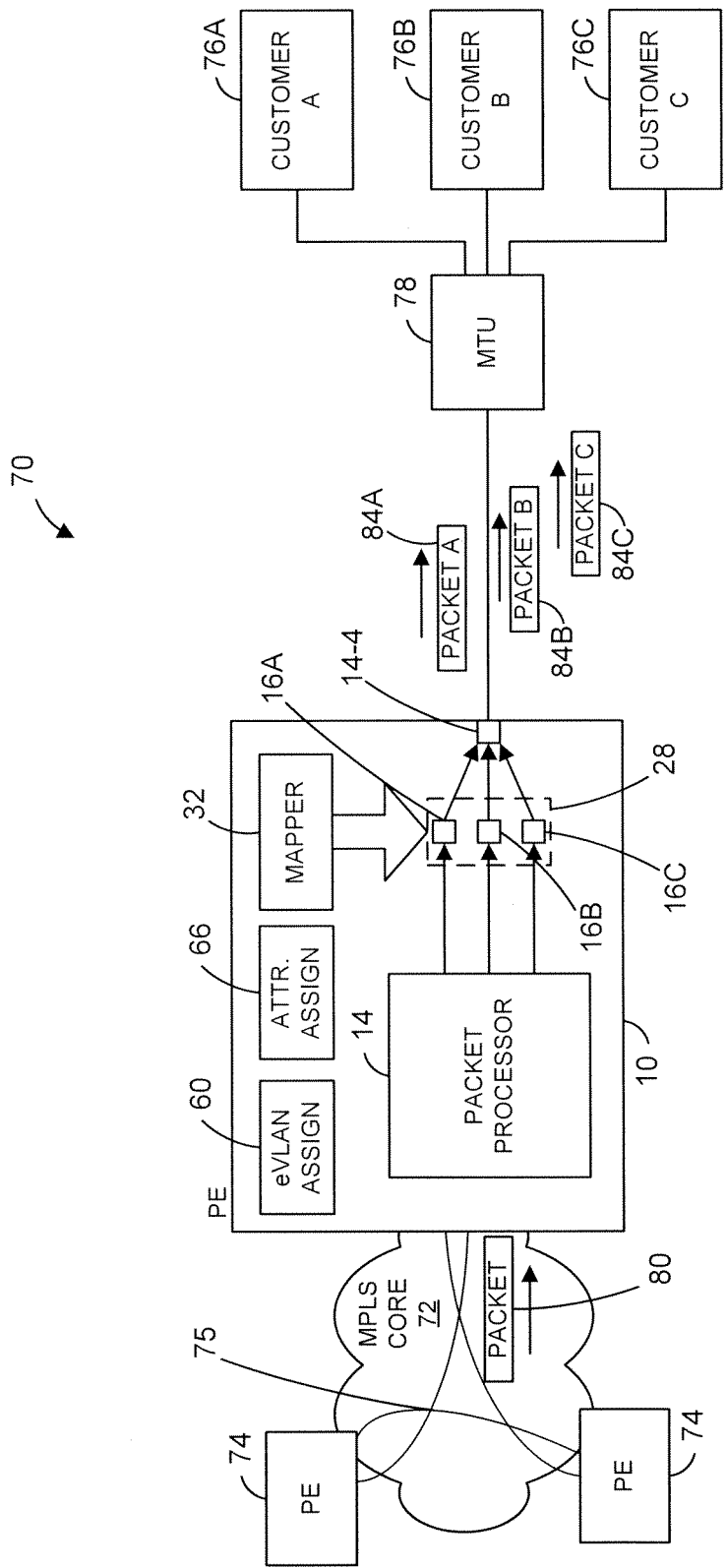
FIG. 2 is a block diagram of a network that utilizes the network device of FIG. 1, according to an embodiment.

To illustrate operation of the network device 10, an example scenario is described with reference to FIG. 2. FIG. 2 is a block diagram of an example network 70, according to an embodiment, that utilizes the network device 10. In the embodiment of FIG. 2, the network device 10 is or is a component of a provider edge device (PE). The network 70 includes a multi-protocol label switching (MPLS) core network 72 having other PE's 74. The PE 10 and the PE's 74 are linked via a virtual private LAN service (VPLS) 75. The PE 10 is communicatively coupled to a plurality of customer networks 76 via a multi-tenant unit switch (MTU) 78.

In the example scenario illustrated in FIG. 2, the PE 10 receives a packet 80 via the MPLS core 72. The mapper 32 assigns to the packet 80 an eport 16 (not shown in FIG. 2) corresponding to the MPLS core 72. The eVLAN assignment unit 60 assigns the eVLAN 28 (i.e., the group 28 of eports 16 illustrated in FIG. 1) to the packet 80. The eVLAN 28 includes eports 16A, 16B, and 16C that correspond to customer networks 76A, 76B, and 76C, respectively, and also includes the eport corresponding to the MPLS core 72.

In the example scenario of FIG. 2, the packet processor 14 does not recognize a destination address (DA) of the packet 10 and thus decides that the packet 80 should be flooded to the eVLAN 28. The packet processor 14 duplicates the packet 80 for eports 16A, 16B, and 16C, but filters the eport corresponding to the MPLS core 72 so that the packet 80 is not transmitted back into the MPLS core 72.

The attribute assignment unit 66 assigns different attributes to the packet copies corresponding to the eports 16A, 16B, and 16C. For example, the attribute assignment unit 66 assigns attributes to the packet copy for eport 16A that indicate the packet is to be tunneled encapsulated in an MPLS pseudo wire (PW) label 1, with a PW emulation edge-to-edge (PWE3) control word, to generate a packet 84A. As another example, the attribute assignment unit 66 assigns attributes to the packet copy for eport 16B that indicate i) two VLAN tags should be removed from the packet; ii) a new VLAN tag should be added to the packet; and iii) the packet is to be tunneled encapsulated in an MPLS PW label 2, to generate a packet 84B. As yet another example, the attribute assignment unit 66 assigns attributes to the packet copy for eport 16C that indicate i) an additional VLAN tag should be added to the packet; ii) the packet is to be tunneled encapsulated in an MPLS PW label 3, to generate a packet 84C. The packet processor 14 utilizes the assigned attributes to appropriately process the packet copies and to generate the packets 84A, 84B, and 84C.

The mapper 32 maps each of the eports 16A, 168, and 16C to a single physical port 12-4. Thus, three different packets 84A, 84B, and 84C (all corresponding to the received packet 80) are sent to the MTU 78 via the single physical port 12-4.

Figure 3:
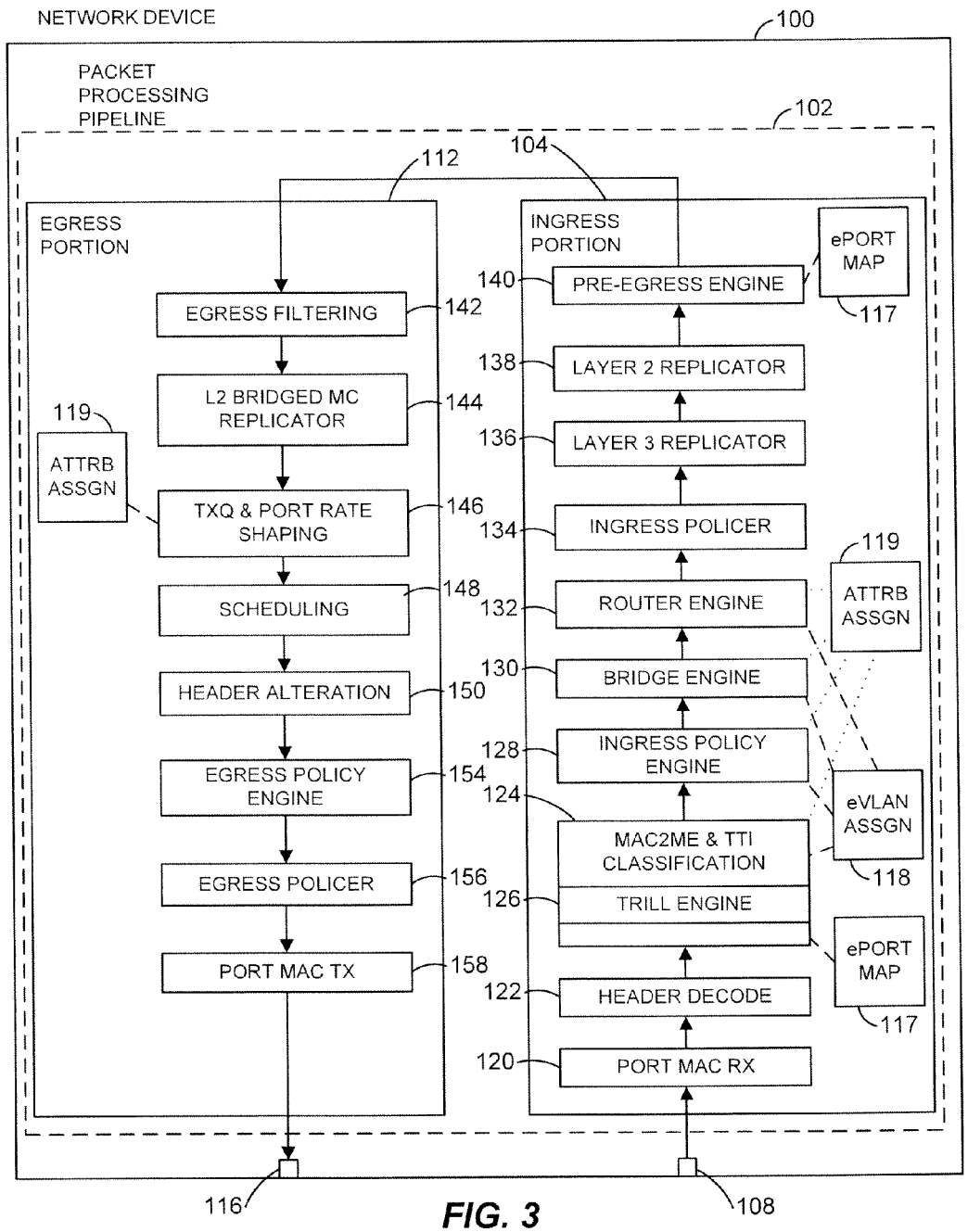
FIG. 3 is a diagram of an example network device, in accordance with another embodiment of the disclosure.

FIG. 3 is a block diagram of an example network device 100 configured for processing and forwarding data units, i.e., packets, according to an embodiment. The network device 100 is one example implementation of the network device 10 of FIG. 1. The network device 100 is configured to utilize eports and eVLANs when processing and forwarding packets. The network device 100 is configured to handle a greater number of eports than the number of physical ports of the network device 100. In some embodiments and scenarios, traffic ingressing on a single physical port is assigned to different eports. For instance, traffic corresponding to different tunnel interfaces but ingressing on the same physical port is assigned to different eports. Referring to FIG. 2, for example, traffic received from the MTU via the single physical port 12-4 includes packets from three different customer networks 76, and packets corresponding to the different customer networks 76 are tunnel encapsulated differently, in one example scenario. As another example, traffic corresponding to different quality of service (QoS) requirements but ingressing on the same physical port is assigned to different eports.

The network device 100 is configured to handle a greater number of eVLANs than the number of VLANs that correspond to a 12-bit VLAN identifier specified in the Institute for Electrical and Electronics Engineers (IEEE) 802.11Q Standard.

In one embodiment, the network device 100 is utilized in a switch system (not shown) comprising a plurality of interconnected switches. In this embodiment, the network device 100 is coupled to other switches in the switch system via some of the physical ports 108, 116. The network device 100 includes a packet processing pipeline 102 coupled to one or more ingress physical ports 108 and to one or more egress physical ports 116. The packet processing pipeline includes an ingress portion 104 coupled to an egress portion 112, in an embodiment.

In one embodiment, a plurality of switches, including the network device 100, are implemented on a plurality of respective integrated circuits (ICs). In some other embodiments, the network device 100 and one or more other switches in the plurality of switches are implemented on a single IC. In one such embodiment, the network device 100 is coupled to one or more other switches in the plurality of switches via one or more corresponding cascade ports.

The ingress physical ports 108 and the egress physical ports 116 are coupled to a plurality of different networks and to other switches in the switching system, in some embodiments. For example, the ingress physical ports 108 and the egress physical ports 116 are coupled to a provider network, to one or more customer networks, and/or to one or more other switches in the switching system, in various embodiments. For purposes of clarity, only one ingress physical port and one egress physical port are seen. In an embodiment the packet processing pipeline is coupled to, and configured to forward packets among, a plurality of physical ports.

In one embodiment, the ingress physical ports 108 and the egress physical ports 116 provide multiple 2-way, point-to-point communication links to other devices, such as bridges, other switches in the switching system, endpoints, etc.

The packet processing pipeline 102 generally transfers packets of data from the ingress physical ports 108 to appropriate egress physical ports 116, in an embodiment. In some embodiments, at least some physical ports are input/output ports, and at least some ingress physical ports 108 and egress physical ports 116 correspond to the same physical ports.

As seen in FIG. 3, the ingress portion 104 and the egress portion 112 each include a plurality of processing units coupled in series. Generally, each unit of a pipeline optionally processes a packet or a packet descriptor corresponding to the packet and then passes the packet or the packet descriptor to the next unit in the pipeline. A packet descriptor includes some information from the packet, such as some or all of the header information of the packet, in an embodiment. In some embodiments, the packet descriptor includes other information as well such as an indicator of where the packet is stored in a memory associated with the network device 100. For ease of explanation, the term "packet" hereinafter is used to refer to a packet itself or to a packet descriptor associated with the packet. Each unit in the pipeline 102 may or may not process a particular packet. For example, in some instances, a unit simply passes a packet onto the next unit in the pipeline 102. The last unit of the ingress portion 104 passes the packet to the first unit of the egress portion 212 via the fabric interface 218, in an embodiment.

Each or at least some of the units of the ingress portion 104 and the egress portion 112 includes, or otherwise is associated with, a corresponding memory, in an embodiment. A packet received by a unit is stored in the memory associated with the unit, in an embodiment.

According to an embodiment, the ingress portion 104 assigns an eport to an ingressing packet. At least in some scenarios, the ingress portion 104 also assigns an eVLAN to the ingressing packet. The ingress portion 104 also assigns attributes to the packet based on the eport and/or the eVLAN. In some embodiments and scenarios, the eport and/or the eVLAN are reassigned as the packet is processed by the ingress portion 104. In some embodiments and scenarios, the egress portion 112 also assigns attributes to the packet based on the eport and/or the eVLAN. The assigned attributes are utilized by units of the pipeline 102 to determine how the packet is to be processed, for example. For example, determining whether to forward, trap, or mirror a packet is based on an attribute assigned based on an eport and/or an eVLAN (i.e., based on an eport, where the number of eports exceeds the number of physical ports of the network device 100; and/or based on an eVLAN, indicative of a group of eports, where the number of possible eVLANs exceeds the maximum number of VLANs capable of being represented by a 12-bit VLAN identifier specified in the Institute for Electrical and Electronics Engineers (IEEE) 802.11Q Standard), in an embodiment. As another example, a source address of a packet is learned or learning of the source address is disabled based on an attribute assigned based on an eport and/or an eVLAN, in an embodiment.

The packet processing pipeline 102 includes a mapping unit 117 at least partially distributed amongst a plurality of processing units, in an embodiment. The mapping unit 117 generally maps physical ports to eports, and vice versa, and operates similarly to the mapping unit 32 discussed with reference to FIG. 1. The packet processing pipeline 102 also includes an eVLAN assignment unit 118 at least partially distributed amongst a plurality of processing units, in an embodiment. In other embodiments, the eVLAN assignment unit 118 is not distributed amongst a plurality of processing units, but rather is implemented in a single processing unit. The eVLAN assignment unit 118 generally assigns a packet to an eVLAN, and operates similarly to the eVLAN assignment unit 60 discussed with reference to FIG. 1. Additionally, the packet processing pipeline 102 includes an attribute assignment unit 119 at least partially distributed amongst a plurality of processing units, in an embodiment. In other embodiments, the attribute assignment unit 119 is not distributed amongst a plurality of processing units, but rather is implemented in a single processing unit. The attribute assignment unit 119 generally assigns attributes to packets based on an eport and/or eVLAN assigned to a packet, wherein the attribute indicates how the packet should be processed by the packet processing pipeline 102. The attribute assignment unit 119 operates similarly to the attribute assignment 66 discussed with reference to FIG. 1.

In the example of FIG. 3, the ingress portion 104 includes a port media access control (MAC) receiver unit 120 coupled to the ingress physical ports 108. The port MAC receiver unit 120 generally implements media access control functions. The port MAC receiver unit 120 also generally interfaces the ingress portion 104 with a particular physical ingress port of the network device 100 (i.e., if the network device 100 includes a plurality of physical ingress ports, the network device 100 includes a plurality of respective port MAC receiver units 120). In another embodiment, one port MAC receiver unit 120 interfaces the ingress portion 104 with a plurality of physical ingress ports (not shown for purposes of clarity) of the network device 100.

A header decode unit 122 is coupled to the port MAC receiver unit 120 and generally decodes the header of each packet received via the ingress physical ports 108. This may include parsing or identifying different segments of the header for use by subsequent units in the ingress pipeline 104 and, optionally, units in the egress pipeline 112. In one embodiment in which the network device 100 is one of a plurality of switches in a switching system, at least some packets may include a distributed switching architecture (DSA) tag in a header of the packet. The DSA tag includes information used by the switching system to forward the packet through the switching system. The DSA tag is included in a header of the packet by a source switch device in the switching system, and is removed from the packet by a target switch device in the switching system before or as the packet egresses the switching system. In one embodiment, the DSA tag includes indications of one or more of i) a source device (i.e., a source switch device in the switching system), ii) a target device (i.e., a target switch device in the switching system), iii) a physical source port, iv) a physical target port, etc. In one embodiment, the DSA tag additionally or alternatively includes indications of one or more of i) a source eport, ii) a target eport, iii) an eVLAN, iv) an index indicating a list of eports and/or v) an index indicating a list of physical ports to which the packet should be replicated (referred to herein as eVIDX and VIDX, respectively), etc. As will be described in more detail below, when a packet is to be broadcast, multicast, flooded, etc., for example, a replication unit of the network device 100 utilizes the VIDX to determine how many copies of a packet to create, and to determine the physical ports to which the copies should be passed. Similarly, when a packet is to be broadcast, multicast, flooded, etc., for example, a replication unit of the network device 100 utilizes the eVIDX to determine how many copies of a packet to create, and to determine the eports to which the copies should be passed.

In an embodiment, VIDX is an index to a VIDX table that indicates physical ports to which the packet is to be duplicated. In one embodiment, each entry in the VIDX table includes a pointer to a list of physical ports to which the packet is to be duplicated. Similarly, in an embodiment, eVIDX is an index to a duplication table that indicates eports to which the packet is to be duplicated. In one embodiment, each entry in the duplication table includes a pointer to a list of eports to which the packet is to be duplicated. In another embodiment, eVIDX is either an index to the VIDX table or an index to the duplication table depending on the value of eVIDX, as will be described in more detail subsequently.

In some embodiments, the use of eVIDX and VIDX is combined. For example, in one embodiment, an eport entry in the eVIDX duplication table indicates a VIDX. In another embodiment, an eport corresponding to an entry in the eVIDX duplication table is mapped to a VIDX. In both of these embodiments, the packet is duplicated both to eports indicated by the eVIDX and physical ports indicated by the VIDX.

A MAC2ME & TTI classification unit 124 is coupled to the header decode unit 122. The MAC2ME & TTI classification unit 124 generally performs several functions. First, the MAC2ME & TTI classification unit 124 assigns a source eport to each packet. In an embodiment, assigning a source eport comprises including a source eport indicator in a packet descriptor for the packet. In some embodiments, the MAC2ME & TTI classification unit 124 reassigns a different source eport to the packet in some circumstances. Assignment and reassignment of source eports will be described in more detail below. In one embodiment, an eport is a 20-bit value that indicates a physical port or a virtual port. In other embodiments, the eport is represented by a different suitable number of bits. In one embodiment in which the network device 100 is one of a plurality of switches in a switching system, the eport is unique to the network device 100 but is not unique with respect to other switches in the system. In some embodiments and scenarios, one or more eports are unique with respect one or more other switches in the system.

Second, the MAC2ME & TTI classification unit 124 assigns an eVLAN to at least some packets. In an embodiment, assigning an eVLAN comprises including an eVLAN indicator in the packet descriptor for the packet. In at least some instances when the packet already includes a VLAN identifier (VID), such as an IEEE 802.1Q VID, assigning the eVLAN is based on the VID in the packet. In some instances, the MAC2ME & TTI classification unit 124 assigns the eVLAN when the packet does not include a VID. In an embodiment and in some situations, assigning the eVLAN is based on a MAC source address in a packet header and, optionally, other information. Assignment of eVLANs will be described in more detail below. In one embodiment, the eVLAN is a 16-bit value.

In other embodiments, the eVLAN is represented by a different suitable number of bits.

Assignment of the eVLAN is based on one or more factors. For example, if the packet includes a DSA tag having a VID, assignment of the eVLAN is based on the VID in the DSA tag, in an embodiment. In some embodiments, assignment of the eVLAN is based on the source physical port and/or the source eport. If the packet includes a VID (e.g., an IEEE 802.1Q VID), assignment of the eVLAN is based on the VID, in an embodiment and at least in some circumstances. In an embodiment, even if the packet includes a VID (e.g., an IEEE 802.1Q VID), assignment of the eVLAN is not based on the VID, at least in some circumstances. In some embodiments, assignment of the eVLAN is based on a tunneling interface.

Third, the MAC2ME & TTI classification unit 124 generally performs two lookup functions. In a first lookup function (a MAC2ME lookup), packets that are destined to a MAC address, VLAN pair recognized by the network device 100 are identified. This identification may be used in one or more subsequent functions or pipeline units. A second lookup function (a tunnel termination and interface assignment (TTI) lookup) is used for tunnel termination identification and interface assignment, reassigning the eport (as discussed above), and/or assigning the eVLAN (as discussed above) according to L2 or L3 header fields.

In an embodiment, the TTI lookup includes using fields of the header of the packet being processed and other information (such as the result of the MAC2ME lookup) as a lookup key to retrieve data from one or more tables. The table data includes indications of actions to be taken, in an embodiment. In some situations, the TTI lookup indicates that the packet is associated with one or more TTI actions, such as reassigning the eport, assigning the eVLAN, assigning quality of service (QoS) parameters, assigning an egress eport, etc., to the packet, in an embodiment.

In one embodiment, the MAC2ME & TTI classification unit 124 includes a TRILL engine 126 configured to operate according to the Transparent Interconnect of Lots of Links (TRILL) protocol set forth in the Request for Comments (RFC) 556 from the Internet Engineering Task Force (IETF), dated May 2009. In one embodiment and in some situations, the TRILL engine 126 reassigns a different eport to the packet.

The MAC2ME & TTI classification unit 124 utilizes one or more tables, databases, and/or other data library maintained in one or more memory components (such as a TCAM). The one or more tables, databases, etc., are consulted to identify a table entry or database record that matches, or closely approximates, the format and structure of the ingressed packet, in an embodiment. The identified table entry or database record includes an index that is employed to retrieve an action entry from a separate memory, such as a static random access memory (SRAM), in an embodiment; additionally, instructions are retrieved regarding how to process the packet in accordance with such information. In other embodiments, separate memories as discussed above are not utilized. Rather, a single table is accessed to retrieve necessary or desired information regarding a packet based upon some or all of the information described above with reference to constructing keys. In another embodiment, the data library and separate memory discussed above are integrated into a single block (such as a table) having different logical memory areas in some implementations.

As discussed above, the MAC2ME & TTI classification unit 124 assigns an egress eport to at least some packets in response to a TTI lookup in an embodiment. On the other hand, in some embodiments, the MAC2ME & TTI classification unit 124 does not assign an egress eport to at least some packets in response to the TTI lookup. In an embodiment, assigning an egress eport comprises including an egress eport identifier in the packet descriptor for the packet. In one embodiment, the MAC2ME & TTI classification unit 124 assigns an eVIDX to at least some packets in response to a TTI lookup in an embodiment. On the other hand, in some embodiments, the MAC2ME & TTI classification unit 124 does not assign an eVIDX to at least some packets. In an embodiment, assigning an eVIDX comprises including an eVIDX identifier in the packet descriptor for the packet.

The MAC2ME & TTI classification unit 124 includes a portion of the mapping unit 117, and the mapping unit 117 implements assignment of the source eport, in an embodiment. Also, the MAC2ME & TTI classification unit 124 includes a portion of the eVLAN assignment unit 118, and the eVLAN assignment unit 118 implements assignment and reassignment of the eVLAN, in an embodiment. Additionally, the MAC2ME & TTI classification unit 124 includes a portion of the attribute assignment unit 119, and the attribute assignment unit 119 implements assignment of attributes based on the eport and/or the eVLAN, in an embodiment.

An ingress policy engine 128 is coupled to the MAC2ME & TTI classification unit 124. The ingress policy engine 128 generally performs flow classification. A flow corresponds to related series of packets, and may be defined in a variety of different ways. One example of a flow is defined by a MAC source address or a particular MAC destination address in a medium access control (MAC) header. In other words, in one example, all packets having a particular MAC source address correspond to a particular flow. Another example of a flow is defined by a MAC source address/destination address pair. In other words, in one example, all packets having both a particular MAC source address and a MAC destination address correspond to a particular flow. Additionally, fields from different protocol layers may be combined to define a flow, in some embodiments. For example, the ingress policy engine 128 attaches or otherwise associates a flow identifier (ID) to/with a packet to indicate a flow to which the packet belongs, in an embodiment. In at least some scenarios and implementations, the flow ID is removed from the packet before or upon egress from the network device 100. For example, if the network device 100 is a component of a switching system including other similar network devices (not shown), and if the packet is exiting the switching system, the flow ID is removed from the packet before or upon egress from the network device 100, in an embodiment. On the other hand, if the network device 100 is a component of a switching system including other similar network devices (not shown), and if the packet is being forwarded to another network device in the switching system, the flow ID is included in a DSA tag of the packet before or upon egress from the network device 100, in an embodiment. In some instances, the ingress policy engine 128 assigns an eVLAN to a packet, according to an embodiment.

In an embodiment, the ingress policy engine 128 includes, or is coupled to, a TCAM or other suitable memory. The ingress policy engine 128 generally uses fields of the header of the packet being processed, and other information such as the source eport, as a key to the TCAM. An entry in the TCAM indicates a particular rule or set of one or more actions to be performed (with regard to flow measurement, eVLAN assignment, egress eport assignment, etc., for example). In some scenarios, at least some of the actions to be performed are to be performed by processing units downstream from the ingress policy engine 128. Thus, in some scenarios, the ingress policy engine 128 assigns attributes to the packet to indicate to downstream processing units how the packet is to be processed. In an embodiment, assigning an attribute comprises including an attribute indicator in the packet descriptor for the packet. The ingress policy engine 128 also includes, or is coupled to, one or more other memories, such as an SRAM or other suitable memory, in an embodiment. In this embodiment, an entry in the TCAM 128 indirectly indicates a rule or set of one or more actions to be performed, and determining a rule or action to be performed utilizes the one or more additional memory components such as the SRAM. For example, an entry in the TCAM may point or otherwise correspond to a particular location in the SRAM that includes information that in turn indicates a particular rule or set of one or more actions to be performed. The ingress policy engine 128 utilizes the result of the MAC2ME lookup of the MAC2ME and TTI classification unit 124, in an embodiment. For example, the result of the MAC2ME lookup is used as part of the key for the TCAM lookup, in an embodiment.

In other embodiments, the ingress policy engine 128 does not utilize a TCAM. For example, a hashing technique or any other suitable technique for classifying multi-field parameters is utilized in other embodiments. Thus, in some embodiments, the TCAM of the ingress policy engine 128 is omitted.

The ingress policy engine 128 includes a portion of the eVLAN assignment unit 118, and the eVLAN assignment unit 118 implements assignment and reassignment of the eVLAN, in an embodiment. Additionally, the ingress policy engine 128 includes a portion of the attribute assignment unit 119, and the attribute assignment unit 119 implements assignment of attributes based on one or more of i) the source eport, ii) the eVLAN, the lookup performed by the ingress policy engine 128, etc. in an embodiment.

A bridge engine 130 is coupled to the ingress policy engine 128. The bridge engine 130 includes, or is coupled to, a forwarding database (not shown) that includes MAC destination addresses and indications of the corresponding egress eports to which packets having the MAC destination addresses should be forwarded. In one embodiment, the forwarding database includes a table of MAC destination addresses and indications of the corresponding egress eports. In an embodiment, the forwarding database more generally includes both MAC source addresses and MAC destination addresses, and provides a binding of a MAC address to an eport and other parameters, such as one or more of a flag indicating whether a packet is to be mirrored by the ingress portion 104 to an ingress analyzer (not shown) for further processing, a flag indicating whether a packet is to be mirrored by the egress portion 112 to an egress analyzer (not shown) for further processing, user defined bits to be used for user-defined functions, etc. These bindings are used mainly for forwarding decisions, but are for other purposes as well, such as for mirroring packets to an analyzer for further analysis, user defined functions or applications, etc. The bridge engine 130 performs MAC source address lookups and MAC destination address lookups, in some embodiments and in at least some scenarios.

In an embodiment, the bridge engine 130 generally uses Layer-2 information to determine on which eport or eports a packet should be forwarded. Determination of whether, and to where a packet should be forwarded, is done by examining the MAC destination address of the packet and determining to which network segment the destination address corresponds using the forwarding database, in some embodiments. Also, other information is utilized as well in other embodiments and/or instances. For example, eVLAN information is utilized in some embodiments and/or instances. For instance, the bridge engine 130 is capable of determining eport destinations for Layer-2 multicast or broadcast packets using eVLAN information, in some embodiments. The bridge engine 130 also maintains the forwarding database, in some embodiments. For instance, the bridge engine 130 learns an eport to which a source MAC address of an ingressing packet corresponds by recording the eport corresponding to the ingressing packet and associating the eport with the source MAC address of the packet, in an embodiment. In another example, the bridge engine 130 learns an eport to which an eVLAN of an ingressing packet corresponds by recording the eVLAN corresponding to the ingressing packet and associating the eport with the eVLAN of the packet, in an embodiment.

In general, the forwarding database correlates several variables useful for making forwarding decisions. The forwarding database comprises entries based upon eVLAN, eport, and MAC address, for instance; lookup operations based upon MAC address and eVLAN are useful in bridging operations, for example. The bridge engine 130 makes forwarding decisions also using information provided by the MAC2ME & TTI classification unit 124, in an embodiment.

Thus, the forwarding database records or table entries include fields associated with one or more of destination MAC address, eport, eVLAN, etc.

In an embodiment, when a packet is to be flooded (e.g., when there is not a match in the forwarding database with the destination MAC address), or when the packet is a multicast or broadcast packet, the bridge engine 130 determines a set of one or more eports to which the packet is to be forwarded. An indicator (referred to herein as "eVIDX") of the determined set of one or more eports is included in or attached to a descriptor associated with the packet, or the indicator of the determined set of one or more ports is attached to the packet for use by subsequent units of the pipeline 102. In one embodiment, eVIDX is used to index a Layer-2 duplication table, wherein each entry in the Layer-2 duplication table includes a pointer to a linked list of eports. In some embodiments, eVIDX is a 16-bit index. In one embodiment, if eVIDX is less than 4K, the eVIDX is interpreted as an indicator of a physical port list. In this embodiment, if eVIDX is greater than or equal to 4K, the eVIDX is interpreted as an indicator of an eport list.

In one embodiment, the bridge engine 130 maintains the Layer-2 duplication table.

The bridge engine 130 includes a portion of the eVLAN assignment unit 118, and the eVLAN assignment unit 118 implements assignment of an egress eVLAN and/or eVIDX, in an embodiment. Additionally, the bridge engine 130 includes a portion of the attribute assignment unit 119, and the attribute assignment unit 119 implements assignment of attributes based on one or more of i) the source eport, ii) the eVLAN, the forwarding database lookup performed by the bridge engine 130, etc. in an embodiment. Examples of attributes assigned by the bridge engine 130, in various embodiments, include enabling trapping to a processor/central processing unit (CPU)/analyzer (not shown) predefined control protocol packets, enabling learning of new addresses, triggering processor/CPU/analyzer (not shown) notification when a new address is learned, indicating an action to be taken when a packet has an unknown or unregistered address, etc A router engine 132 is coupled to the bridge engine 130. If a received packet is not destined for a network to which the network device 100 is connected, then routing based on an Internet Protocol (IP) address is performed, in some embodiments and/or scenarios. The router engine 132 includes, or is coupled to, a routing information database (not shown) that includes information corresponding to where IP packets should be forwarded. The router engine 132 generally determines to where a received IP packet should be routed, which includes determining the egress eports to which the packet should be forwarded. Determining to where a received IP packet should be routed includes examining the IP destination address of the packet and routing information stored in the routing information database. The router engine 132 also maintains the routing information database. Additionally, the router engine 132 determines destinations for IP multicast packets, in some embodiments. In one embodiment, the router engine 132 utilizes a Layer-3 duplication table, wherein each entry in the Layer-3 duplication table is a linked list of eports. In one embodiment, the router engine 132 maintains the Layer-3 duplication table. In one embodiment, the router engine 132 assigns an eVLAN and/or an eVIDX to a multicast packet to indicate the eports to which the packet is to be duplicated.

The router engine 132 includes a portion of the eVLAN assignment unit 118, and the eVLAN assignment unit 118 implements assignment of an eVLAN and/or eVIDX, in an embodiment. Additionally, the outer engine 132 includes a portion of the attribute assignment unit 119, and the attribute assignment unit 119 implements assignment of attributes based on one or more of i) the source eport, ii) the eVLAN, the routing information database lookup performed by the router engine 132, etc. in an embodiment. Examples of attributes assigned by the router engine 132, in various embodiments, include enabling/disabling of routing of Internet Protocol version 4 (IPv4) unicast packets, enabling/disabling of routing of IPv4 multicast packets, enabling/disabling of routing of Internet Protocol version 6 (IPv6) unicast packets, enabling/disabling of routing of IPv6 multicast packets, whether to perform source IP address-source MAC address checking (SIP-SA check) (a security check that checks whether the source IP address and the source MAC address of a packet are coupled in the routing information database), etc.

An ingress policer engine 134 is coupled to the router engine 132. The ingress policer engine 134 generally performs rate limiting and makes flow traffic measurements and stores flow measurement information for different flows, according to an embodiment. In some embodiments, the ingress policer engine 134 takes different actions for different flows. In an embodiment, the ingress policer engine 134 utilizes flow classification information from the ingress policy engine 128 in determining what actions should be taken. The ingress policer engine 134 includes a plurality of counters for making flow traffic measurements, according to an embodiment. The ingress policer engine 134 samples packets, according to an embodiment. Additionally, the ingress policer engine 134 applies time stamps to packets or to descriptors associated with the packets, according to an embodiment.

A Layer-3 replicator unit 136 is coupled to ingress policer engine 134. When a Layer-3 routed packet that is to be transmitted to multiple destinations is received by the Layer-3 replicator unit 136, the Layer-3 replicator unit 136 creates one or more duplicates of the packet for forwarding to the set of one or more eports determined by the router engine 132. In an embodiment, the Layer-3 replicator unit 136 utilizes the Layer-3 duplication table.

A Layer-2 replicator unit 138 is coupled to the Layer-3 replicator unit 136. When a Layer-2 bridged packet that is to be transmitted to multiple destinations is received by the Layer-2 replicator unit 138, the Layer-2 replicator unit 138 creates one or more duplicates of the packet for forwarding to the set of one or more eports determined by the bridge engine 130. In an embodiment, the Layer-2 replicator unit 138 utilizes the Layer-2 duplication table to determine the eports to which the packet is to be directed. In an embodiment, the Layer-2 replicator unit 138 includes a duplication engine to perform packet duplication. In an embodiment, Layer-2 duplication table includes an attribute that indicates whether an egress eport is associated with a provider edge device. If the egress eport and the ingress eport both corresponds to provider edge devices, the Layer-2 replicator unit 138 performs filtering so that the packet is not forwarded to the downstream edge device (e.g., it is dropped), according to an embodiment and/or scenario. As an alternative, if the ingress eport is associated with a provider edge device but the egress eport is not marked in the Layer-2 duplication table as corresponding to a provider edge device, then the packet is forwarded in accordance with other information maintained in the attribute or packet descriptor. Operation of the Layer-2 replicator unit 138, according to an embodiment, is described in more detail subsequently.

In one embodiment in which the eVIDX is a 16-bit index, if eVIDX is less than 4K, the Layer-2 replicator unit 138 does not perform replication. Rather, Layer-2 replication is performed subsequently in the pipeline 102, as will be discussed below.

A pre-egress engine 140 is coupled to the Layer-2 replicator unit. The pre-egress engine 140 consolidates decisions of previous units in the ingress portion 104 into a single decision, and updates the descriptor of the packet accordingly.

The egress portion 112 is coupled to the pre-egress engine 140, in an embodiment. In one embodiment and in some scenarios, the pre-egress engine 140 determines one or more physical targets corresponding to the one or more target eports to which a packet is to be forwarded when the target device for the packet is the network device 100. A physical target could be a physical port/device pair, a trunk, a tunnel start, a list of physical ports, etc. The pre-egress engine 140 includes a portion of the mapping unit 117, and the mapping unit 117 implements a determination of the one or more physical targets corresponding to each target eport to which a packet is to be forwarded, in an embodiment. In one embodiment and in at least some scenarios in which an eport is to be mapped to a plurality of physical ports, the eport is mapped to a VIDX which indicates the plurality of physical ports.

In an embodiment, an egress filtering unit 142 is coupled to the pre-egress engine 140. The egress filtering unit 142 utilizes eports and/or eVLANs to perform egress filtering.

In some scenarios, a packet that is to be flooded, or a multicast or broadcast packet is not to be egressed via the same eport on which it ingressed. Thus, the egress filtering unit 142 filters the ingress eport from the plurality of egress eports via which the packet is to be transmitted, for example.

An egress Layer-2 multicast replicator unit (L2 Bridged MC Replicator) 144 is coupled to the egress filtering unit 142. The Layer-2 multicast replicator unit 144 replicates packets, in some scenarios, such as packets received from another switch device and that are to be flooded, or are multicast or broadcast packets. A multi-target destination is indicated via eVIDX, in an embodiment. If a packet is multi-target (i.e. broadcast, multicast, or unknown unicast), the packet is replicated for each egress eport member of the eVIDX group.

In one embodiment in which the eVIDX is a 16-bit index, if eVIDX is greater than or equal to 4K, the Layer-2 multicast replicator unit 144 does not perform replication. Rather, Layer-2 replication is performed either in another switch device or in the Layer-2 replicator unit 138. In this embodiment, if eVIDX is less than 4K, the eVIDX is interpreted as an indicator of a physical port list and the Layer-2 multicast replicator unit 144 performs replication to the physical ports indicated by the list.

The Layer-2 multicast replicator unit 144 provides unicast traffic to at least one of a plurality of transmit queues. For Layer-2 duplicated packets, the Layer-2 multicast replicator unit 144 replicates the packet to physical ports according to the eVIDX, which indicates the physical ports (as will be described subsequently). In an embodiment, the Layer-2 multicast replicator unit 144 also provides a copy of the packet to a transmit queue corresponding to another switch device (i.e., a cascade port. In an embodiment, the transmit queue corresponding to the cascade port is designated a specific local target port indicator (e.g., a number such as 24), and thus the Layer-2 multicast replicator unit 144 provides a copy of the packet to the cascade port, at least in some scenarios. For example, if a first switch device decides to send a packet to a second switch device (e.g., because the data frame is a multicast data frame), the first switch device merely sends the data frame to the designated cascade port. In this embodiment, multicast packets are forwarded amongst the switch devices, and the transmit queue corresponding to the last transmit queue in the chain terminates the relayed copy to prevent loops. In another embodiment, a transmit queue corresponding to the other switch device is designated a specific physical global target port indicator.

In an embodiment, the Layer-2 multicast replicator unit 144 includes a portion of the attribute assignment unit 119, and the attribute assignment unit 119 implements assignment of attributes based on one or more of i) the target eport, ii) the eVLAN, etc. in an embodiment. In another embodiment, the Layer-2 multicast replicator unit 144 does not include a portion of the attribute assignment unit 119 and is not involved in assigning attributes.

The Layer-2 multicast replicator unit 144 provides the packet to a transmit queuing and port rate shaping unit (transmit queuing unit) 146. The transmit queuing unit 146 generally queues packets in a plurality of queues corresponding to different classes of flows and/or different physical ports, for example. The transmit queuing unit 146 also generally performs rate shaping. In an embodiment, the Layer-2 multicast replicator unit 144 utilizes the eVIDX as an index to a VIDX table to determine a set of physical ports to which the packet is to be duplicated, in some scenarios as will be discussed below in more detail. If a packet is assigned a VIDX, the Layer-2 multicast replicator unit 144 utilizes the VIDX as an index to the VIDX table to determine the set of physical ports to which the packet is to be duplicated.

The transmit queueing unit 146 includes a portion of the attribute assignment unit 119, and the attribute assignment unit 119 implements assignment of attributes based on one or more of i) the target physical port, ii) the target eport, iii) the eVLAN, etc. in an embodiment. Examples of attributes that are assigned based on the target eport include whether to enable egress filtering, whether to enable spanning tree protocol filtering, whether to enable unicast local switching filtering, whether to enable multicast local switching filtering, a VLAN tag state (i.e., an indication of which VLAN tag(s) to include in the egressing packet, and, if multiple VLAN tags, the order of the tags), etc. In an embodiment, whether to enable egress filtering is an example of an attribute that is assigned based on the target eport and/or the target physical port. In an embodiment, a VLAN tag state is an attribute that is assigned based on the target eport and/or the eVLAN.

A scheduling unit 148 is coupled to the transmit queuing unit 146. A header alteration unit 150 is coupled to the scheduling unit 148. In some scenarios, an ingressing packet has a VLAN field and MAC field in the packet header, and in some scenarios, it is necessary to modify the VLAN field (e.g., depending upon the VLAN associated with the MAC DA) or to multicast the packet to destination devices in different VLANs. It is noted that modification of a packet header may occur upon ingress to the provider network or upon egress from the provider network. The header alteration unit 150 may maintains information allowing a packet header to be appropriately manipulated to facilitate such multicast operations. In some implementations, the header alteration unit 150 manipulates the packet header independently or in cooperation with other units of the egress portion 112. The header alteration unit 150 enables control of tagging for customer networks or other subnetwork implementations, in some embodiments. To support this functionality, the header alteration unit 150 is embodied in or comprises a lookup table, database, or other suitable data structure correlating packet attribute information, eVLANs, VIDs, MAC addresses, and customer VLAN tagging preferences. Additionally, the header alteration unit 150 points to a tunnel start entry that provides information regarding the required external header for a packet, in some scenarios; in that regard, a tunnel start entry defines a tunnel to be used to transmit the packet across a provider network.

An egress policy engine 154 is coupled to the header alteration unit 150. The egress policy engine 154 generally performs flow classification. When the packet belongs to a recognized flow, the egress policy engine 154 associates the packet with the flow. For example, the egress policy engine 154 attaches a flow identifier (ID) to a packet to indicate a flow to which the packet belongs, in an embodiment. In at least some scenarios and implementations, the flow ID is removed from the packet before or upon egress from the network device 100. For example, if the network device 100 is a component of a switching system including other similar network devices (not shown), and if the packet is exiting the switching system, the flow ID is removed from the packet before or upon egress from the network device 100, in an embodiment. On the other hand, if the network device 100 is a component of a switching system including other similar network devices (not shown), and if the packet is being forwarded to another network device in the switching system, the flow ID is included in a DSA tag of the packet before or upon egress from the network device 100, in an embodiment.

An egress policer engine 156 is coupled to the egress policy engine 154. The egress policer engine 156 generally performs rate limiting and makes flow traffic measurements, in an embodiment.

A port MAC transmit unit 158 is coupled to the egress policer engine 156. The port MAC transmit unit 158 generally implements media access control functions and forwards packets to appropriate egress physical ports 116.

Attributes assigned by the ingress portion 104 (i.e., ingress attributes) are assigned based on the source eport and the eVLAN. In one embodiment in which the network device 100 is one of a plurality of switches in a switching system, ingress attributes are only utilized by the pipeline 102 and are not utilized by other switches. In another embodiment, one or more ingress attributes are also utilized by other switches. For example, if the source eport is a global eport (i.e., the eport is unique with respect to the plurality of switches), one or more ingress attributes are utilized by one or more other switches in the switching system.

Ingress attributes assigned based on the source eport are referred to as ingress eport attributes. In one embodiment, ingress eport attributes are assigned based on an ingress eport attribute table. For example, the ingress eport attribute table provides attributes corresponding to different source eports, and the source eport provides an index to the ingress eport attribute table. In one embodiment, the ingress eport attribute table is distributed among different units of the ingress portion 104. In one embodiment, the ingress eport attribute table is included in the attribute assignment unit 119, which is itself at least partially distributed among different units of the ingress portion 104.

Ingress attributes assigned based on the eVLAN are referred to as ingress eVLAN attributes. In one embodiment, ingress eVLAN attributes are assigned based on an ingress eVLAN attribute table. For example, the ingress eVLAN attribute table provides attributes corresponding to different eVLANs, and the eVLAN provides an index to the ingress eVLAN attribute table. In one embodiment, the ingress eVLAN attribute table is included in the attribute assignment unit 119.

Attributes assigned by the egress portion 112 (i.e., egress attributes) are assigned based on the target eport and the eVLAN. In one embodiment in which the network device 100 is one of a plurality of switches in a switching system, egress attributes are only utilized by the pipeline 102 and/or by other switches in the switching system.

Egress attributes assigned based on the target eport are referred to as egress eport attributes. In one embodiment, egress eport attributes are assigned based on an egress eport attribute table. For example, the egress eport attribute table provides attributes corresponding to different target eports, and the target eport provides an index to the egress eport attribute table. In one embodiment, the egress attribute table is included in the attribute assignment unit 119.

In one embodiment, egress attributes relevant only for the egress physical port are stored in a separate egress physical port attribute table. For example, the egress physical port attribute table provides attributes corresponding to different target physical ports, and the target physical port provides an index to the egress physical port attribute table.

In another embodiment, egress attributes relevant only for the egress physical port are stored in the egress eport attribute table.

Egress attributes assigned based on the eVLAN are referred to as egress eVLAN attributes. In one embodiment, egress eVLAN attributes are assigned based on an egress eVLAN attribute table. For example, the egress eVLAN attribute table provides attributes corresponding to different eVLANs, and the eVLAN provides an index to the egress eVLAN attribute table. In one embodiment, the egress eVLAN attribute table is included in the attribute assignment unit 119.

Operation of the network device 100, according to an embodiment, will now be described in the context of a packet being processed by the network device 100. A packet is received via one of the ingress physical ports 108 and is processed by the port MAC receive unit 120 and the header decode unit 122.

The MAC2ME & TTI classification unit 124 assigns (performed by mapping unit 117) the source eport as the physical port 108 via which the packet was received. Additionally, the MAC2ME & TTI classification unit 124 assigns (performed by attribute assignment unit 119) one or more ingress eport attributes to the packet based on the assigned eport. Assigning the one or more ingress eport attributes comprises performing a lookup in the ingress eport attribute table using the assigned eport, in one embodiment.

If the packet is a TRILL packet, the TRILL engine 126 processes the packet. In one embodiment, processing of a TRILL packet by the TRILL engine 126 comprises reassigning (performed by mapping unit 117) the source eport of the packet. After reassignment of the source eport of the packet, the eport corresponds to a virtual port, in an embodiment.

Additionally, the MAC2ME & TTI classification unit 124 performs a TTI lookup. At least in some scenarios, the TTI lookup indicates that the eport is to be reassigned, and the MAC2ME & TTI classification unit 124 reassigns the eport (performed by mapping unit 117).

In one embodiment, if the eport is reassigned, the MAC2ME & TTI classification unit 124 assigns one or more ingress eport attributes to the packet based on the new eport (performed by attribute assignment unit 119). Assigning the one or more ingress eport attributes comprises performing a lookup in the ingress eport attribute table using the new eport, in one embodiment.

In at least some scenarios, the MAC2ME & TTI classification unit 124 assigns an eVLAN to the packet (performed by the eVLAN assignment unit 118). For example, if a DSA tag or the packet includes a VID, the MAC2ME & TTI classification unit 124 assigns the eVLAN based on the VID (performed by the eVLAN assignment unit 118), in an embodiment. As just one example, the MAC2ME & TTI classification unit 124 (performed by the eVLAN assignment unit 118) sets the eVLAN to the VID. In one embodiment, if the packet is a TRILL packet, the TRILL engine 126 assigns (performed by the eVLAN assignment unit 118) the eVLAN, in at least some scenarios. In another embodiment, the TRILL engine 126 does not assign the eVLAN. In one embodiment, the TTI lookup indicates that the eVLAN is to be assigned in at least some scenarios, and the MAC2ME & TTI classification unit 124 assigns (performed by the eVLAN assignment unit 118) the eVLAN according to the TTI lookup.

The ingress policy engine 128 attaches or otherwise associates a flow identifier to/with the packet to indicate allow to which the packet belongs, in an embodiment. The ingress policy engine 128 utilizes the eport and/or the eVLAN to determine the flow identifier and/or to take other actions. In some embodiments, the flow identifier and/or other actions determined based on the eport are considered ingress attributes based on the eport and/or the eVLAN. In some instances, the ingress policy engine 128 assigns an eVLAN to the packet, according to an embodiment. In one embodiment, the ingress policy engine 128 determines the eVLAN based on the eport. In some embodiments, ingress attributes based on the eVLAN are assigned to the packet by the ingress policy engine 128. For example, in some embodiments, the ingress policy engine 128 assigns one or more of the following attributes based on the eVLAN: an action to be taken when the source address of the packet is unknown to the network device 100, whether Layer-3 multicast and/or broadcast mirroring is enabled, whether and what type of eVLAN-based metering should be performed by the ingress policer engine unit 134, etc.

The bridge engine 130 makes a forwarding decision (e.g., assigns a target eport, eVLAN, and/or eVIDX) and assigns ingress attributes based on eport and/or eVLAN. For example, the bridge engine 130 assigns a target eport to which a packet is to be forwarded and assigns an attribute indicating whether the packet is to be mirrored to an ingress analyzer (not shown) based on the eport, in some scenarios. As another example, the bridge engine 130 assigns an eVIDX to a packet to indicate a list of eports to which a packet should be forwarded based on the eVLAN, in some scenarios.

The ingress policer engine 134 performs rate limiting, makes flow traffic measurements, and stores flow measurement information for a flow corresponding to the packet, according to an embodiment. In some embodiments, ingress eport attributes and/or ingress eVLAN attributes indicate which measurements should be made, whether sampling should be performed and how, whether time stamps should be applied, etc.

If the packet is to be transmitted to multiple eports, the Layer-2 replicator unit 138 creates one or more duplicates of the packet for forwarding to the set of one or more eports determined by the bridge engine 130. In an embodiment, the Layer-2 replicator unit 138 utilizes eVIDX as an index to the Layer-2 duplication table to determine the eports to which the packet is to be transmitted. Additionally, the duplication of the Layer-2 replicator unit 138 duplicates the packet. In one embodiment, an entry in the Layer-2 duplication table can be an indicator of a VIDX. In this embodiment, if an entry in Layer-2 duplication table is an indicator of a VIDX, the packet is additionally duplicated by the Layer-2 multicast replicator unit 144.

The pre-egress engine 140 determines one or more physical targets corresponding to the one or more target eports to which the packet is to be forwarded. A physical target could be a physical port/device pair, a trunk, a tunnel interface, etc. In an embodiment, the mapping unit 117 determines the one or more physical targets.

The egress filtering unit 142, the Layer-2 multicast replicator unit 144, the transmit queuing unit 146, and the scheduling unit 148 utilize egress eport attributes and egress eVLAN attributes to process the packet, including performing egress filtering, eport or eVLAN mirroring, egress spanning tree protocol based on eports, etc. In one embodiment, the egress eport attribute table is implemented in the transmit queuing unit 146. The egress eport attribute table indexed by the target eport. In an embodiment, the Layer-2 multicast replicator unit 144 utilizes the eVIDX as an index to a VIDX table to determine a set of physical ports to which the packet is to be duplicated, in some scenarios as will be discussed below in more detail. If a packet is assigned a VIDX, the Layer-2 multicast replicator unit 144 utilizes the VIDX as an index to the VIDX table to determine the set of physical ports to which the packet is to be duplicated.

If the packet is to have a VID added to the header, the header alteration unit 150 converts the eVLAN to a VID and adds the VID to the header. If an already existing VID included in the packet is to be modified, the header alteration unit 150 modifies the VID. In one embodiment, the header alteration unit 150 implements an egress physical port attribute table that includes attributes relevant only for the physical port. In this embodiment, the header alteration unit 150 indexes the egress physical port attribute table using the physical egress port number of the packet.

Figure 4:
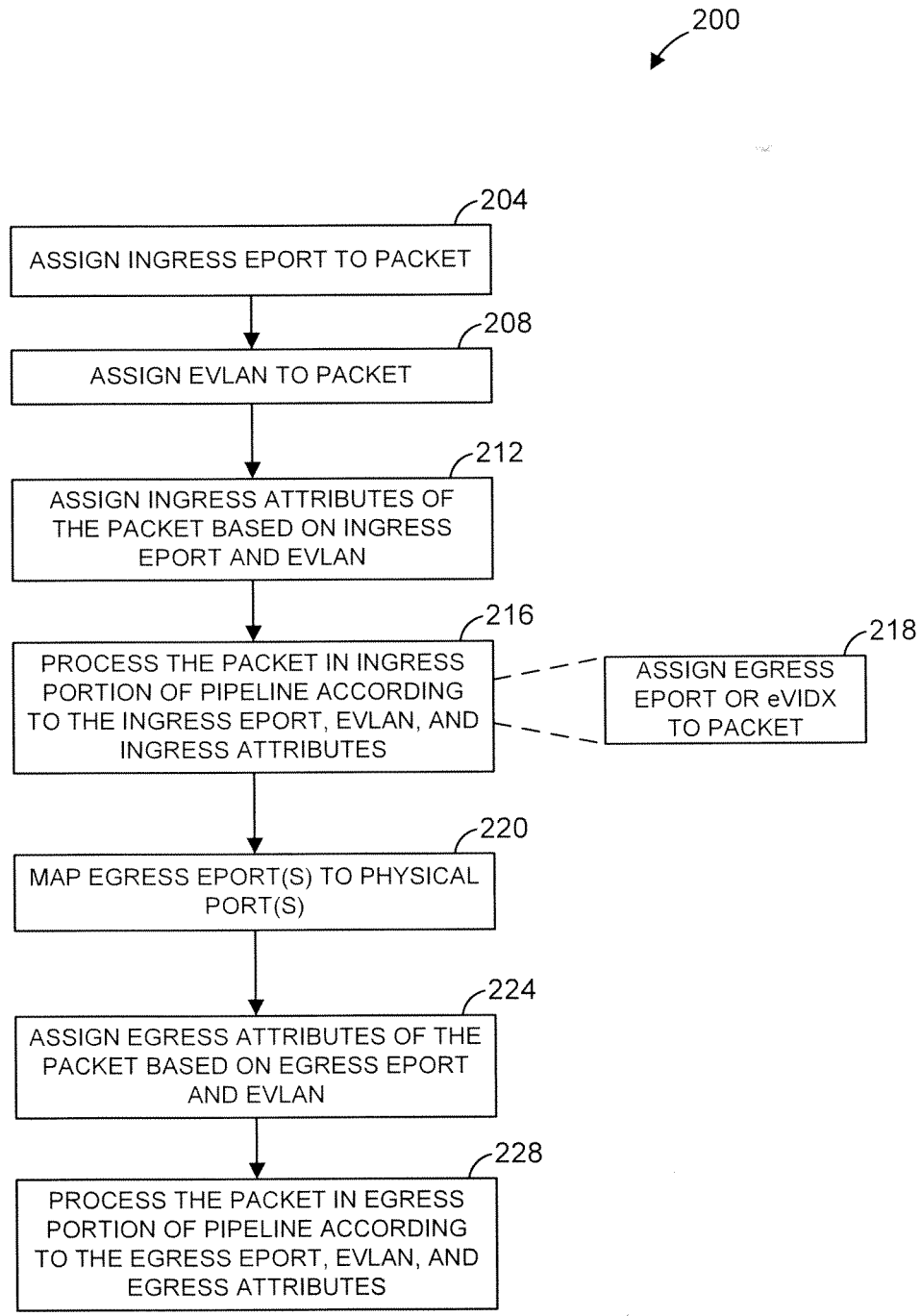
FIG. 4 is a flow diagram of an example method for processing a packet in a packet processing pipeline of a switch, in accordance with an embodiment of the disclosure.

FIG. 4 is a flow diagram of an example method 200 for processing a packet in a packet forwarding pipeline of a switch. The method 200 is implemented by the network device 100 of FIG. 3, in an embodiment, and the method 200 is described with respect to FIG. 3 for ease of explanation. However, in other embodiments, the method 200 is implemented by another suitable packet processing pipeline different than that of the network device 100.

At block 204, an ingress eport is assigned to an ingressing packet. In an embodiment, the ingress eport is a virtual ingress interface decoupled from physical ports of the network device 100 or from physical ports of other switches in a switching system. For example, different packets received via the same physical port may be assigned to different eports. In various embodiments and scenarios, assigning the ingress eport is based on one or more of a physical port at which the packet was received, a tunnel corresponding to the packet, a TRILL link corresponding to the packet, a DSA tag of the packet, a QoS parameter associated with the packet, a flow to which the packet belongs, etc. As an example, different packets received via the same physical port are assigned different source eports based on one or more of i) whether a packet is tunneled, ii) the tunnel interface of a packet, iii) a QoS requirement of the packet, etc. In one embodiment, the MAC2ME & TTI classification unit 124/mapping unit 117 assigns the ingress eport to the packet. More generally, a classification engine of the packet processing pipeline assigns the ingress eport to the packet. In some embodiments, the classification engine may also act as or include a tunnel termination and interface assignment engine.

At block 208, an eVLAN is assigned to the ingressing packet. In an embodiment, the eVLAN is a virtual domain decoupled from physical ports of the network device 100 and/or from IEEE 802.1Q VLANs. For instance, an eVLAN corresponds to one or more eports, which are themselves decoupled from physical ports, in at least some scenarios. As an example, different packets received via the same physical port may be assigned to different eVLANs. As another example, there may be more eVLANs than the maximum number of IEEE 802.1Q VLANs. In various embodiments and scenarios, assigning the eVLAN is based on one or more of a physical port via which the packet was received, the eport assigned at block 204, a tunnel corresponding to the packet, a TRILL link corresponding to the packet, a VID of the packet, a VLAN or eVLAN identifier in a DSA tag of the packet, a QoS parameter associated with the packet, a flow to which the packet belongs, etc. In one embodiment, the eVLAN assignment unit 118 assigns the eVLAN. As the eVLAN assignment unit 118 is distributed among different units of the pipeline 102, different units of the pipeline 102 assign the eVLAN in different scenarios. For example, in some scenarios, the MAC2ME & TTI classification unit 124 assigns the eVLAN to the packet. For example, if a packet is a tunnel terminated packet, a TRILL packet, or if the packet includes a DSA tag having a VLAN or eVLAN identifier, the MAC2ME & TTI classification unit 124 assigns the eVLAN in an embodiment. If the eVLAN is assigned based on the assigned eport, the MAC2ME & TTI classification unit 124 assigns the eVLAN in an embodiment. If the eVLAN is assigned based on a QoS parameter or a flow to which the packet is associated, the ingress policy engine 128 assigns the eVLAN, in an embodiment. More generally, one or more suitable classification engines of the packet processing pipeline assign the eVLAN to the packet according to different scenarios, in an embodiment. In some embodiments, a first one of the classification engines may also act as or include a tunnel termination and interface assignment engine, and a second one of the classification engines may act as or include a flow classification engine.

At block 212, ingress attributes are assigned to the packet based on the eport and eVLAN assigned at blocks 204 and 208, respectively. In an embodiment, a first set of ingress attributes are assigned using an ingress eport attribute table and using the assigned ingress eport to index the table. In an embodiment, the attribute assignment unit 119 assigns the ingress attributes. As the attribute assignment unit 119 is distributed among different units of the pipeline 102, different units of the pipeline 102 assign the ingress attributes in different scenarios. In an embodiment, the ingress eport attribute table is distributed among a plurality of ingress pipeline units. For example, in the network device 100, the ingress eport attribute table is distributed among a plurality of units of the ingress portion 104 including the MAC2ME & TTI classification unit 124, the ingress policy engine 128, the bridge engine 130, and the router engine 132. In an embodiment, a second set of ingress attributes are assigned using an ingress eVLAN attribute table and using the assigned eVLAN to index the table. In an embodiment, the attribute assignment unit 119 assigns the ingress eVLAN attributes. In an embodiment, the ingress eVLAN attribute table is distributed among a plurality of ingress pipeline units.

At block 216, the packet is processed in the ingress portion of the pipeline according to the ingress eport, eVLAN, and the ingress attributes corresponding to blocks 204, 208, and 212, respectively. In some embodiments, ingress attributes are utilized for tunnel termination and/or TRILL lookups. In some embodiments, ingress attributes indicate how the packet is to be processed. For example, ingress attributes indicate one or more of: 1) whether a packet is to be trapped, mirrored, etc.; 2) whether and how a packet is to be metered; 3) whether and how a packet is to be time stamped; etc., according to various embodiments. In some embodiments, ingress attributes are utilized for bridging functions. For example, ingress attributes indicate one or more of: 1) whether a packet is to be forwarded; 2) whether the ingress eport is to be learned; 3) whether a spanning tree protocol is to be implemented; etc., according to various embodiments. Similarly, in some embodiments, ingress attributes are utilized for routing functions.

In one embodiment, the block 216 includes assigning an egress eport or eVIDX to the packet (block 218) in at least some scenarios. The block is implemented by the eVLAN assignment unit 118 an/or one or more of i) the MAC2ME and TTI classification engine 124, ii) the ingress policy engine 128, iii) the bridge engine 130, and iv) the router engine 132, in an embodiment and in various scenarios.

At block 220, each egress eport corresponding to the packet is mapped to a corresponding one or more physical egress ports. The block 220 is implemented by the mapping unit 117 and/or the pre-egress engine 140, in some embodiments.

At block 224, egress attributes are assigned to the packet based on the egress eport and eVLAN assigned at blocks 220 and 208, respectively. In an embodiment, a first set of egress attributes are assigned using an egress eport attribute table and using the assigned egress eport to index the table. In an embodiment, the egress eport attribute table is distributed among a plurality of egress pipeline units. For example, in the network device 100, the egress eport attribute table is distributed among a plurality of units of the egress portion 112 including the egress filtering unit 142 and the transmit queuing unit 146. In an embodiment, a second set of egress attributes are assigned using an egress eVLAN attribute table and using the assigned eVLAN to index the table. In an embodiment, the egress eVLAN attribute table is distributed among a plurality of egress pipeline units.

At block 228, the packet is processed in the egress portion of the pipeline according to the egress eport, eVLAN, and the egress attributes corresponding to blocks 218, 208, and 224, respectively. In some embodiments, egress eport, eVLAN, and/or egress attributes are utilized for one or more of egress filtering, executing the spanning tree protocol, header alteration, mirroring, egress policy control and policing, etc. In some embodiments, egress attributes indicate how the packet is to be processed. For example, egress attributes indicate one or more of: 1) whether a packet is to be trapped, mirrored, etc.; 2) whether and how a packet is to be metered; 3) whether and how a packet is to be time stamped; etc., according to various embodiments.

Figure 5:
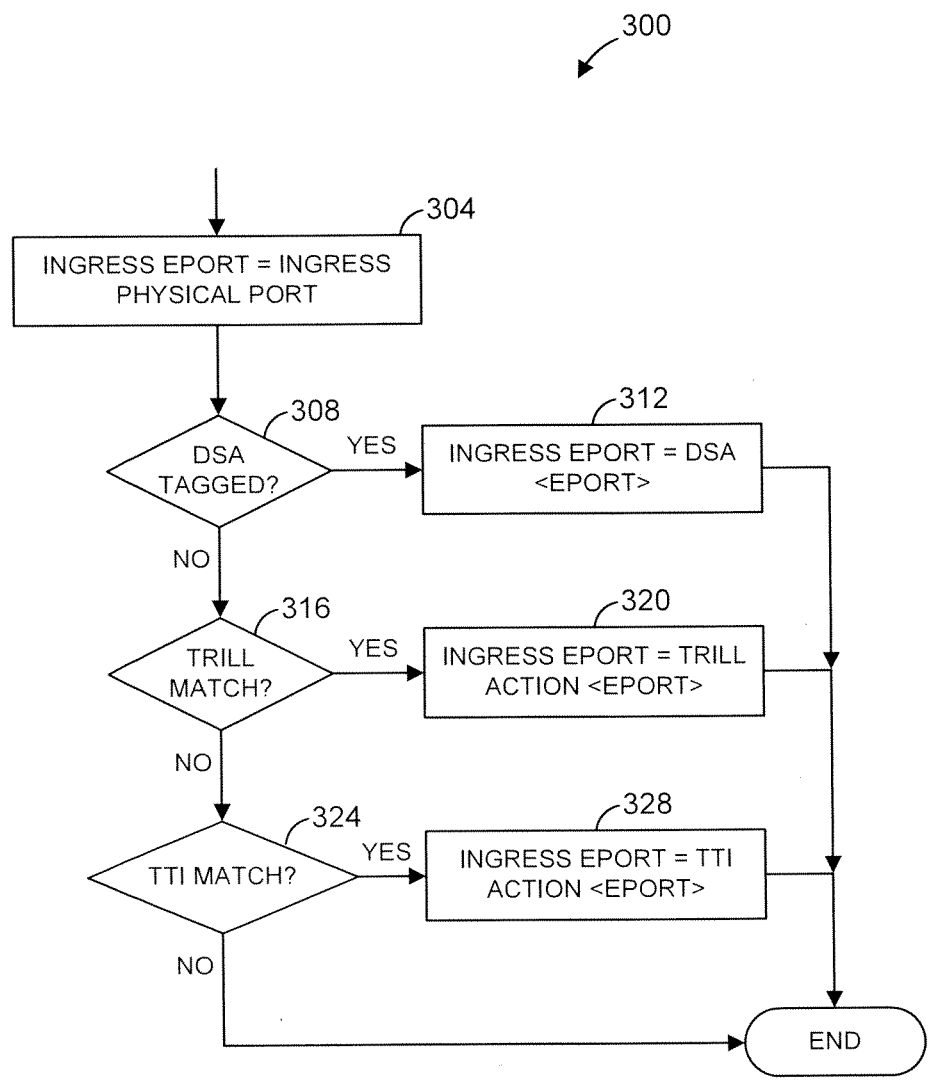
FIG. 5 is a flow diagram of an example method of assigning an eport to a packet, in accordance with an embodiment of the disclosure.

FIG. 5 is a flow diagram of an example method 300 for assigning an ingress eport to a packet. The method 300 is implemented by the network device 100 of FIG. 3. For example, in one embodiment, the method 300 is implemented by the mapping unit 117 and/or the MAC2ME & TTI classification unit 124. However, in other embodiments, the method 300 is implemented by another suitable packet processing pipeline different than that of the network device 100. For example, in another embodiment, the method 300 is implemented by one or more suitable classification engines and/or mapping units.

At block 304, a default assignment of the ingress eport. In one embodiment, the ingress eport is set to a value corresponding to an identifier of the physical ingress port via which the packet was received. In other embodiments, other suitable default assignments are utilized. In one embodiment, the default assignment is configurable.

At block 308, it is determined whether the packet is tagged with a DSA tag. If it is determined that the packet is tagged with a DSA tag, the flow proceeds to block 312. At block 312, the ingress eport is set to the ingress eport indicated in the DSA tag, and the flow ends.

If, at block 308, it is determined that the packet is not tagged with a DSA tag, the flow proceeds to block 316. At block 316, it is determined whether the packet is a TRILL packet. For example, in one embodiment, the TRILL engine 126 determines whether the packet is a TRILL packet. In an embodiment, the determination of whether the packet is a TRILL packet comprises a TRILL lookup that is based on the default ingress eport assignment of block 304. If it is determined that the packet is a TRILL packet, the flow proceeds to block 320. At block 320, the ingress eport is set as specified by a TRILL action. For example, the TRILL action specifies an ingress eport, in an embodiment.

If, at block 316, it is determined that the packet is not a TRILL packet, the flow proceeds to block 324. At block 324, it is determined whether there is a TTI lookup match. In an embodiment, the TTI lookup is based on the default ingress eport assignment of block 304 and/or other criteria such as one or more of i) assigned ingress attributes, ii) an eVLAN, iii) fields in a header of the packet, etc. If it is determined that there is a TTI match, the flow proceeds to block 320. At block 320, the ingress eport is set as specified by a TTI action corresponding to the TTI match, in an embodiment. For example, the TTI action specifies an ingress eport, in an embodiment. In other embodiments, the ingress eport is not set at block 320 as specified by the TTI action in some scenarios. Rather, even when there is a TTI match and when the TTI action indicates reassigning the ingress eport, in some scenarios the ingress eport is not reassigned.

In other embodiments, the flow of the method 300 is modified. For example, in some embodiments, after block 312, the flow proceeds to block 316. Then, at blocks 320 and/or 328, the eport is reassigned in some scenarios. For example, in some scenarios, if the packet is DSA tagged (block 308) and if there is a TTI match (block 324), the eport is reassigned at block 328. On the other hand, in other scenarios in which the packet is DSA tagged (block 308) and when there is a TTI match (block 324), the eport is not reassigned at block 328, but rather the eport assignment remains as it was assigned at block 312. Similarly, in some embodiments, after block 320, the flow proceeds to block 324. Then, at blocks 328, the eport is reassigned in some scenarios. For example, in some scenarios, if the packet is DSA tagged (block 308) and if there is a TTI match (block 324), the eport is reassigned at block 328. On the other hand, in other scenarios in which the packet is DSA tagged (block 308) and when there is a TTI match (block 324), the eport is not reassigned at block 328, but rather the eport assignment remains as it was assigned at block 312 or block 320.

In some embodiments in which, after block 320, the flow proceeds to block 324, the eport is reassigned in some scenarios. As an example, in some scenarios, if there is a TRILL match (block 316) and the eport is reassigned at block 320, and if there is also a TTI match (block 324), the eport is reassigned at block 328. On the other hand, in other scenarios in which there is a TRILL match (block 316) and when there is a TTI match (block 324), the eport is not reassigned at block 328, but rather the eport assignment remains as it was assigned at block 320.

As another example, in one embodiment, the default ingress eport assignment (block 304) is performed after blocks 308, 316, and 324. In other embodiments, the order of blocks 308, 316, and 324 is different. For example, the determination of whether the packet is a TRILL packet (block 316) occurs before determining whether the packet is tagged with a DSA tag (block 308), in an embodiment. Similarly, the determination of whether there is a TTI lookup match (block 324) comes before determining whether the packet is tagged with a DSA tag (block 308), in an embodiment. Similarly, the determination of whether the packet is a TRILL packet (block 316) occurs after determining whether there is a TTI lookup match (block 324), in an embodiment.

Figure 6:
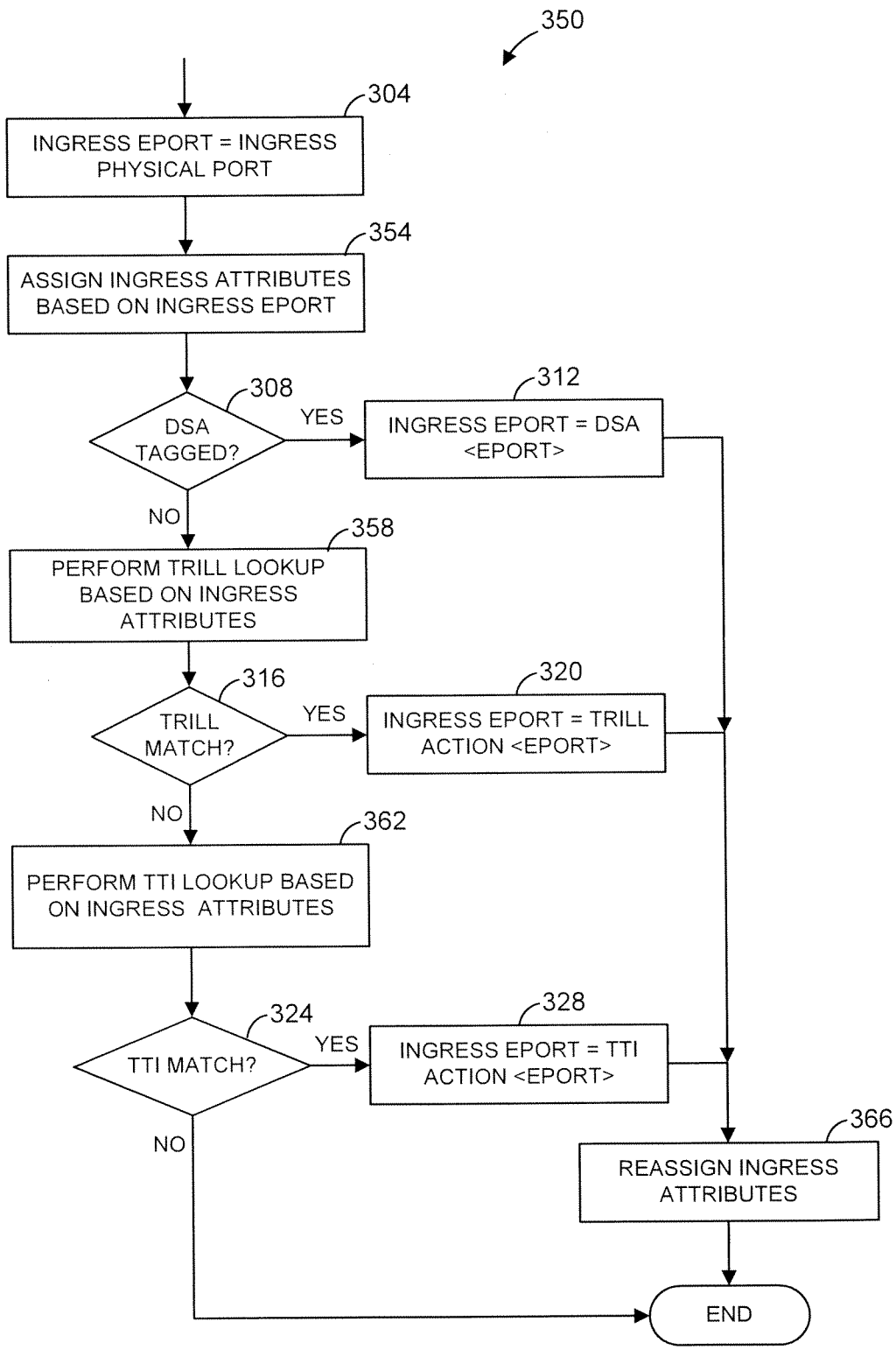
FIG. 6 is a flow diagram of an example method of assigning attributes to a packet based on an eport, in accordance with an embodiment of the disclosure.

FIG. 6 is a flow diagram of an example method 350 for assigning an ingress eport to a packet. The method 350 is implemented by the network device 100 of FIG. 3. For example, in one embodiment, the method 350 is implemented by the MAC2ME & TTI classification unit 124. However, in other embodiments, the method 350 is implemented by another suitable packet processing pipeline different than that of the network device 100. For example, in another embodiment, the method 350 is implemented by one or more suitable classification engines.

The method 350 is similar to the method 300 of FIG. 5, and like numbered blocks are not discussed.

At block 354, one or more ingress attributes are assigned based on the default ingress eport assignment at block 304.

At block 358, a TRILL lookup is performed based on one or more of i) the one or more ingress attributes assigned at block 354, ii) the default ingress eport assignment at block 30, iii) assigned ingress attributes, iv) an eVLAN, v) fields in a header of the packet, etc. In an embodiment, the TRILL lookup is performed based on the one or more ingress attributes assigned at block 354 and the default ingress eport assignment at block 304, at least in some scenarios.

At block 362, a TTI lookup is performed based on one or more of i) the one or more ingress attributes assigned at block 354, ii) the default ingress eport assignment at block 30, iii) assigned ingress attributes, iv) an eVLAN, v) fields in a header of the packet, etc. In an embodiment, the TTI lookup is performed based on the one or more ingress attributes assigned at block 354 and the default ingress eport assignment at block 304, at least in some scenarios.

At block 366, the one or more ingress attributes assigned at block 354 are reassigned based on the ingress eport assignment at block 312, 320, or 328.

In some embodiments of the network device 100 or another network device configured to implement the method 200 of FIG. 4, the method 300 of FIG. 5, and/or the method 350 of FIG. 6, and in which the network device is one of a plurality of switches in a switching system, some eports may be designated as globally unique with respect to the plurality of switches (referred to herein as "global eports"). Global eports will be described with respect to the network device 100 of FIG. 3 for ease of explanation. In other embodiments, other types of switches, such as switches configured to implement the method 200 of FIG. 4, the method 300 of FIG. 5, and/or the method 350 of FIG. 6, implement global eports. Global eports may be utilized with link aggregate groups and in other implementations discussed below, for example.

In an embodiment, global eports are reserved to a range of eport values. In this embodiment, the network device 100 can recognize that an eport in a DSA tag, e.g., an eport assigned to a packet by another switch, is a global eport. In an embodiment, the range is configurable to allow different numbers of global eports, for example. In another embodiment, a flag in a DSA tag and/or a packet descriptor is used to indicate a global eport. With global eports, the pipeline 104 is configured to ignore a device identifier associated with a global eport when it would otherwise compare eport/device identifier pairs, such as with bridge learning, source filtering, etc.

Another instance in which global eports may be useful is with equal cost multipath (ECMP), where multiple eports lead to a common destination. For example, a primary ECMP eport is designated as a global eport whereas secondary ECMP eports are designated as non-globally unique eports, in some embodiments. The secondary ECMP eports associated with a primary ECMP port are referred to herein as an "ECMP eport block". Packets to be forwarded to a target that is in the ECMP eport block are assigned the primary ECMP eport as the target eport. Similarly, packets ingressing via any eport in the ECMP eport block are assigned the primary ECMP eport as the source eport.

Figure 7:
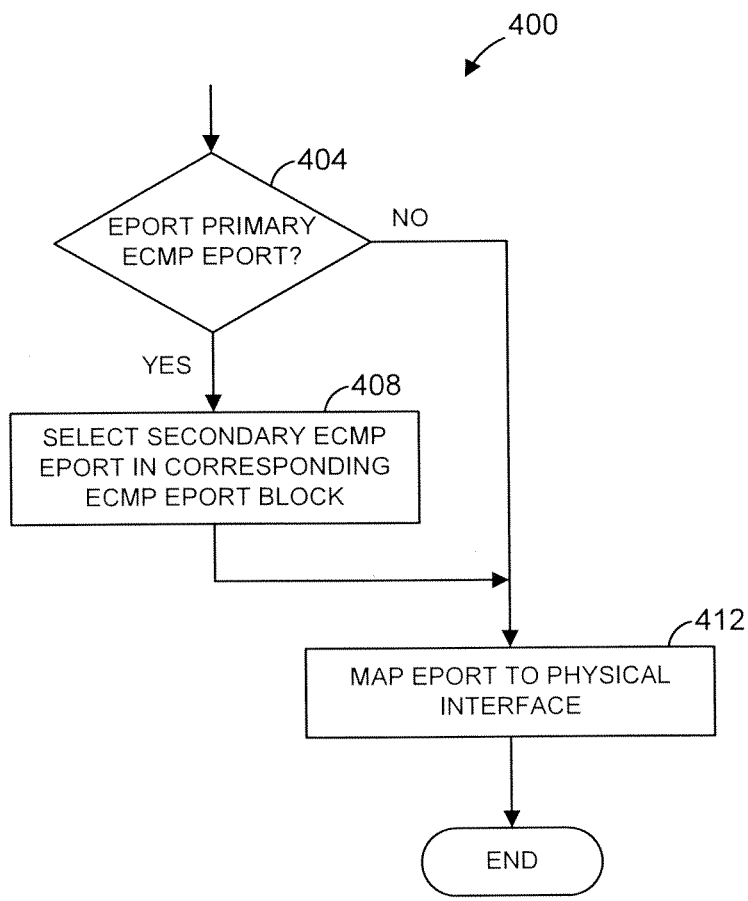
FIG. 7 is a flow diagram of an example method of mapping an eport to a physical interface, in accordance with an embodiment of the disclosure.

FIG. 7 is a flow diagram of an example method 400 for mapping a target eport to a physical interface, such as a physical port, a trunk, a tunnel start, etc., according to an embodiment. In some scenarios, the target eport is determined as the result of a unicast forwarding decision. In other scenarios, the target eport is determined as the result of a multicast or broadcast forwarding decision, or as a result of a flooding decision. For example, in one embodiment, the eport is indicated by an eVIDX. In other words, for each eport indicated by the eVIDX, the eport is mapped to a physical interface using the method 400, in an embodiment. In one embodiment in which the method is implemented in a network device among a plurality of switches of a switching system, the method is implemented in response to a forwarding decision that indicates the target is an eport and that the target device is the local device.

The method 400 is implemented by the network device 100 of FIG. 3. For example, in one embodiment, the method 400 is implemented by the pre-egress engine 140. However, in other embodiments, the method 400 is implemented by another suitable packet processing pipeline different than that of the network device 100. For example, in another embodiment, the method 400 is implemented by a unit of a packet processing pipeline that maps eports to physical interfaces.

At block 404, it is determined whether the eport is a primary ECMP port. In one embodiment, determining whether the eport is a primary ECMP port comprises indexing an ECMP eport table by the eport. If the eport is not a primary ECMP eport, the ECMP eport table returns a suitable indicator, such as a NULL pointer. On the other hand, if the eport is a primary ECMP eport, the ECMP eport table returns a pointer to an eport lookup translation table (LIT) entry. In one embodiment, when the LTT is indexed with the primary ECMP eport, the LTT returns an entry that includes an ECMP enable bit (basically indicating that this LTT entry is valid), an index to a block of ECMP eports represented by the primary ECMP eport, and an indication of the size of the block (e.g., an indicator of the number of secondary eports in the block of ECMP eports). Thus, in one embodiment, determining whether the eport is a primary ECMP port comprises indexing an ECMP eport table by the eport and determining whether the ECMP eport table returns a suitable indicator, such as a NULL pointer.

If it is determined that the eport is a primary ECMP eport, the flow proceeds to block 408. At block 408, a secondary ECMP eport in the corresponding ECMP eport block is selected. In one embodiment, as discussed above, the ECMP eport table returns a pointer to an eport LTT entry. The eport LTT entry specifies a set of ECMP eport block attributes including a pointer to a block of ECMP eport entries corresponding to the secondary eports, and an indicator of the number of secondary eports in the block of ECMP eports. In an embodiment, the block of ECMP eport entries is accessed using a hash index. In one embodiment, one of two different hash indices is utilized based on different scenarios. For example, a first hash index corresponds to ECMP selection and a second hash index corresponds to link aggregate group selection, in an embodiment. The hash index into the block of ECMP eport entries returns a target device/eport, in one embodiment.

From block 408, the flow proceeds to block 412. Additionally, if it is determined at block 404 that the eport is not a primary ECMP eport, the flow proceeds to block 412. At block 412, the eport is mapped to a physical target. In one embodiment, an egress eport table maps eports to physical targets.

In embodiments in which a switching system comprises a plurality of switch devices, blocks 404 and 408 are implemented by the source device, whereas block 412 is implemented by the target device. For example, in an embodiment, the source device determines the target eport/target device pair, and the target eport/target device pair is indicated in the DSA tag. The source device then forwards the packet to the target device. The target device then maps the eport to the physical target.

Referring again to FIG. 3, in one embodiment, the Layer-2 replicator unit 138 utilizes eVIDX as an index to the Layer-2 duplication table to determine the eports to which the packet is to be transmitted. As discussed above, eVIDX is used to index to a Layer-2 duplication table, wherein each entry in the Layer-2 duplication table includes a pointer to a linked list of eports. In one embodiment, each entry also includes a mask profile for use in determining whether and how to mask linked list entries. In some embodiments, if eVIDX is less than 4K or some other suitable value, the Layer-2 replicator unit 138 does not perform duplication. Rather, eVIDX is treated as an indicator of a physical port list. In an embodiment, when eVIDX is less than 4K, the Layer-2 multicast replicator unit 144 uses eVIDX as an index to a VIDX table. Each entry in the VIDX table includes a pointer to a list of physical ports to which the packet is to be duplicated, and the transmit queuing unit 146 creates duplicates of the packet and adds the duplicates to transmit queues corresponding to the physical ports indicated by the linked list.

Figure 8:
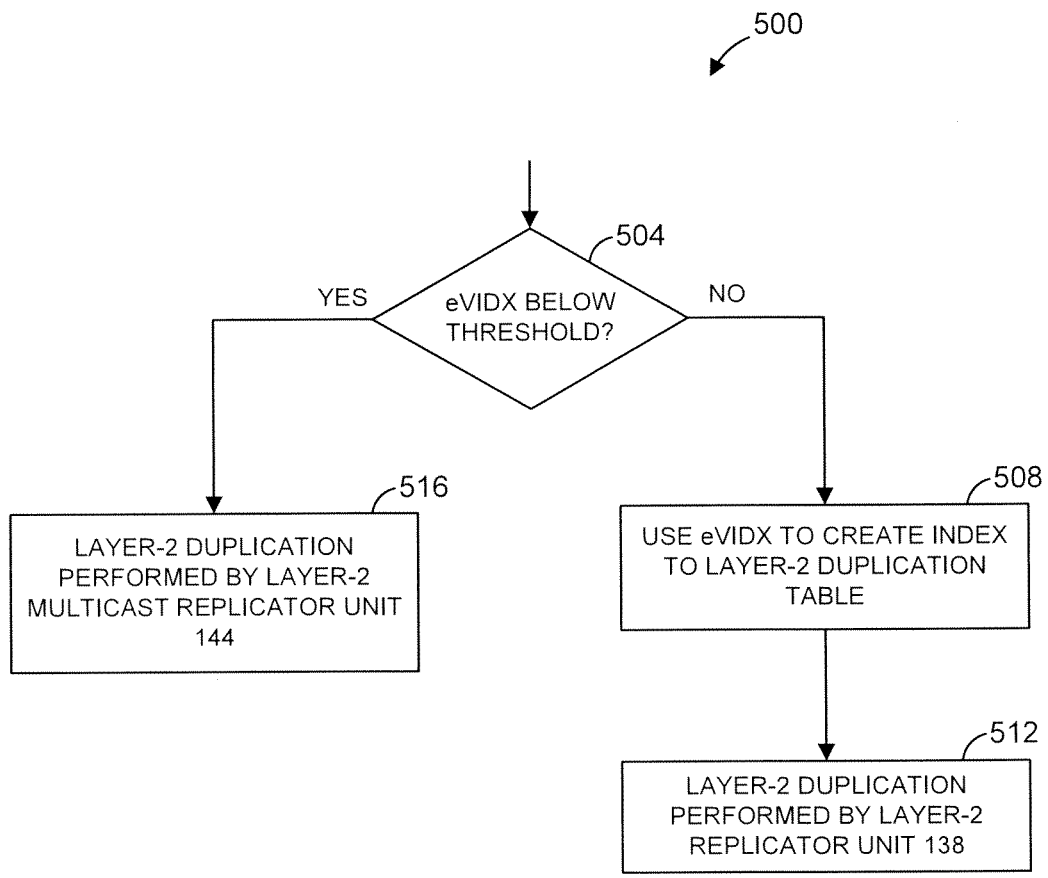
FIG. 8 is a block diagram of an example method of performing Layer-2 duplication of a packet, in accordance with an embodiment of the disclosure.

FIG. 8 is a flow diagram of an example method 500 for performing Layer-2 duplication, according to an embodiment. The method 500 is implemented by the pipeline 102 (FIG. 3), in an embodiment, and is discussed with respect to FIG. 3 for ease of explanation. In other embodiments, a similar method is implemented in another suitable packet processing pipeline of a network device. The method 500 utilizes the eVIDX, which is used to index either the Layer-2 duplication table of the Layer-2 replicator unit 138 or the VIDX table of the Layer-2 multicast replicator unit 144.

At block 504, it is determined whether a value of eVIDX is less than a threshold value, wherein whether the value of eVIDX is less than the threshold value indicates whether eVIDX corresponds to a list of eports or a list of physical ports. In one embodiment, eVIDX is a 16-bit number and the threshold value is 4K. In other embodiments, eVIDX includes a different number of bits and/or the threshold value is another suitable value. If it is determined that the value of eVIDX is not less than the threshold value, this indicates eVIDX corresponds to a list of eports and the flow proceeds to block 508.

At block 508, eVIDX is used to create an index to the Layer-2 duplication table. In an embodiment in which the threshold value is 4K, the index is created by subtracting 4K from eVIDX.

At block 512, Layer-2 duplication is performed by the Layer-2 replicator unit 138 using the index created at block 508. In one embodiment, the indexed Layer-2 duplication table provides a pointer to a linked list of eports. The duplication engine of the Layer-2 replicator unit 138 duplicates the packet for forwarding to the eports indicated by the linked list.

On the other hand, if at block 504 it is determined that the value of eVIDX is less than the threshold value (e.g., less than 4K, in an embodiment), this indicates eVIDX corresponds to a list of physical ports and the flow proceeds to block 516. At block 516, eVIDX is used to index the VIDX table to determine physical ports to which the packet is to be duplicated, and Layer-2 duplication is performed by the Layer-2 multicast replicator unit 144. In one embodiment, the indexed VIDX table of the Layer-2 multicast replicator unit 144 provides a pointer to a list of physical ports. A duplication engine of the Layer-2 multicast replicator unit 144 duplicates the packet for forwarding to the physical ports indicated by the list. In one embodiment in which cascade ports are utilized, an entry of the list of physical ports may correspond to forwarding to cascade ports. In an embodiment, a cascade port is a port for forwarding a packet to an adjacent switch device in a switching system. In another embodiment, different cascade ports may correspond to different entries in the list of physical ports.

In an embodiment and in some scenarios, the indexed Layer-2 duplication table provides a pointer to a linked list of egress interfaces, wherein an egress interface can be an eport or an eVIDX with a value less than the threshold value (e.g., less than 4K). In this embodiment, if one of the egress interfaces in the linked list is eVIDX with a value less than the threshold value, the Layer-2 replicator unit 138 duplicates the packet and assigns the eVIDX to the packet. Then, the packet is duplicated to a list of physical ports as described with respect to block 516.

In one embodiment, an entry in the Layer-2 duplication table can correspond to a VIDX. In this embodiment, when an entry in the Layer-2 duplication table corresponds to a VIDX, the Layer-2 multicast replicator unit 144 also duplicates the packet to a set of physical ports indicated by the VIDX. In other words, duplication is performed both by the Layer-2 replicator unit 138 and the Layer-2 multicast replicator unit 144. In another embodiment, an eport entry in the Layer-2 duplication table is mapped by the pre-egress engine 140 to a VIDX. In this scenario, the Layer-2 multicast replicator unit 144 also duplicates the packet to a set of physical ports indicated by the VIDX. In other words, duplication is performed both by the Layer-2 replicator unit 138 and the Layer-2 multicast replicator unit 144.

Figure 9:
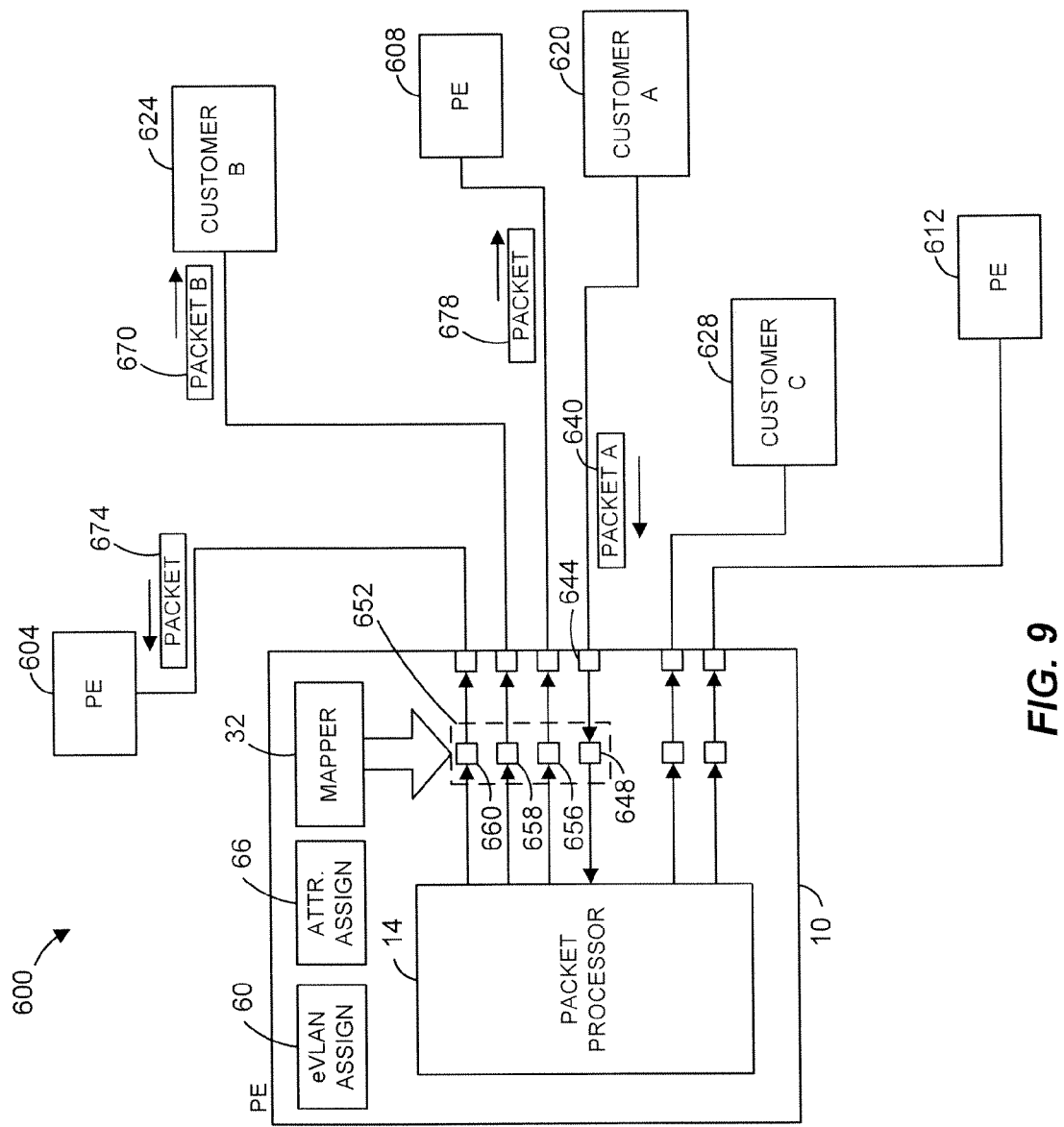
FIG. 9 is a block diagram of another network that utilizes the network device of FIG. 1, according to an embodiment.

FIG. 9 is a block diagram of an example network 600, according to an embodiment, that utilizes the network device 10. In the embodiment of FIG. 9, the network device 10 is or is a component of a provider edge device (PE). The network 600 includes other PE's 604, 608, 612 communicatively coupled to the PE 10. The PE 10 is also communicatively coupled to a plurality of customer networks 620, 624, 628.

In the example scenario illustrated in FIG. 9, the PE 10 receives a packet 640 (packet A) from the customer network 620 via a physical port 644. The mapper 32 assigns an eport 648 corresponding to the physical port 644 to the packet 640. The eVLAN assignment unit 60 assigns an eVLAN 652 to the packet 640. The eVLAN 652 includes the eport 648, and eports 656, 658, and 660 that correspond to PE 608, customer network 624, and PE 604, respectively.

In the example scenario of FIG. 9, the packet processor 14 does not recognize a destination address (DA) of the packet 10 and thus decides that the packet 640 should be flooded to the eVLAN 652. For example, the packet processor 14 assigns to the packet 640 an eVIDX corresponding to the eVLAN 652. The packet processor 14 duplicates the packet 640 for eports 656, 658, and 660, but filters the eport 648 so that the packet 640 is not transmitted back to the customer network 620. Although in FIG. 9 there are only illustrated a number of eports equal to the number of physical ports, the PE 10 includes a greater number of eports than the number of physical ports.

The attribute assignment unit 66 assigns different attributes to the packet copies corresponding to the eports 656, 658, and 660. For example, the attribute assignment unit 66 assigns attributes to the packet copy for eport 658 that indicate the packet is to be tunnel terminated, and then tunneled encapsulated in an MPLS PW label 1, to generate a packet 670. As another example, the attribute assignment unit 66 assigns attributes to the packet copy for eport 656 that indicate that the packet is to be tunnel terminated, a VLAN tag should be removed from the packet, and the packet is to be tunneled encapsulated in an MPLS PW label 2 with a PWE3 control word, to generate a packet 674. As yet another example, the attribute assignment unit 66 assigns attributes to the packet copy for eport 660 that indicate that the packet is to be tunnel terminated, an additional VLAN tag should be added to the packet, and the packet is to be tunnel encapsulated in an MPLS PW label 3, to generate a packet 678. The packet processor 14 utilizes the assigned attributes to appropriately process the packet copies and to generate the packets 670, 674, and 678.

The mapper 32 maps the eports 656, 658, and 660 to respective physical ports.

It is noted that each of the blocks of the figures may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software instructions may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc. Referring to FIG. 3, in accordance with an embodiment, the pipeline 102 is implemented on a single integrated circuit (IC). In other embodiments, the pipeline 102 is implemented on a plurality of ICs. For example, in one embodiment, the ingress portion 104 is implemented on a first IC and the egress portion is implemented on a second IC, according to an embodiment.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A network device, comprising:
   a plurality of physical ports;
   a packet processor coupled to the plurality of physical ports, wherein the packet processor is configured to:
   assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port,
   assign a virtual domain from a plurality of virtual domains to the packet based on the assigned virtual port, wherein the assigned virtual domain corresponds to a group of virtual ports within the plurality of virtual ports, and
   process the packet based on one or more of i) the assigned virtual port, ii) the assigned virtual domain, and iii) a header field of the packet, wherein processing the packet includes determining zero, one, or more physical ports to which the packet is to be forwarded.

2. A network device according to claim 1, wherein the packet processor is configured to:
   assign attributes to the packet based on the assigned virtual port and the assigned virtual domain, and
   process the packet based on the assigned attributes.

3. A network device according to claim 2, wherein the assigned virtual port is a second virtual port and the assigned attributes are second attributes, and wherein the packet processor is configured to assign the second virtual port by:
   assigning a first virtual port to the packet,
   assigning first attributes to the packet based on the assigned first virtual port, and
   assigning the second virtual port to the packet based on the assigned first attributes.

4. A network device according to claim 1, wherein the assigned virtual port is a second virtual port, and wherein the packet processor is configured to assign the second virtual port by:
   assigning a first virtual port to the packet based on a physical port via which the packet ingressed,
   determining that a different virtual port should be assigned to the packet, and
   assigning the second virtual port to the packet in response to determining that the different virtual port should be assigned to the packet.

5. A network device according to claim 4, wherein the packet processor is configured to determine that a different virtual port should be assigned to the packet based on whether the packet is tagged with a tag including a virtual port identifier.

6. A network device according to claim 4, wherein the packet processor is configured to determine that a different virtual port should be assigned to the packet based on whether the packet should be tunnel terminated.

7. A network device according to claim 4, wherein the packet processor is configured to determine that a different virtual port should be assigned to the packet based on whether the packet corresponds to the Transparent Interconnect of Lots of Links (TRILL) protocol.

8. A network device according to claim 4, wherein the packet processor is configured to determine that a different virtual port should be assigned to the packet based on one or more fields of a header of the packet.

9. A network device according to claim 1, wherein the packet processor is configured to determine zero, one, or more physical interfaces to which the packet is to be forwarded by:
   determining zero, one, or more target virtual ports to which the packet is to be forwarded, and
   for each determined target virtual port, mapping the virtual port to a physical interface.

10. A network device according to claim 1, wherein the packet processor is configured to determine zero, one, or more physical interfaces to which the packet is to be forwarded by:
    determining a primary equal cost multipath (ECMP) virtual port to which the packet is to be forwarded, determining a secondary ECMP virtual port corresponding to the primary ECMP virtual port, and mapping the secondary ECMP virtual port to a physical interface.

11. A network device according to claim 1, wherein the packet processor is configured to:

determine an indicator of a plurality of virtual ports or a plurality of physical ports to which the packet is to be forwarded, determine whether the indicator corresponds to virtual ports or to physical ports, duplicate the packet at a first packet processing unit in the packet processor if the indicator corresponds to virtual ports, and duplicate the packet at a second packet processing unit in the packet processor if the indicator corresponds to physical ports.

12. A packet processing method, comprising:

receiving a packet via a source physical port from a plurality of physical ports;

assigning a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port;

assigning a virtual domain from a plurality of virtual domains to the packet based on the assigned virtual port, wherein the assigned virtual domain corresponds to a group of virtual ports within the plurality of virtual ports; and processing the packet with a packet processor based on one or more of i) the assigned virtual port, ii) the assigned virtual domain, and iii) a header field of the packet, wherein processing the packet includes determining zero, one, or more physical ports to which the packet is to be forwarded.

13. A method according to claim 12, further comprising:

assigning attributes to the packet based on the assigned virtual port and the assigned virtual domain;

wherein processing the packet with the packet processor is further based on the assigned attributes.

14. A method according to claim 13, wherein the assigned virtual port is a second virtual port and the assigned attributes are second attributes, and wherein assigning the second virtual port comprises:

assigning a first virtual port to the packet, assigning first attributes to the packet based on the assigned first virtual port, and assigning the second virtual port to the packet based on the assigned first attributes.

15. A method according to claim 12, wherein the assigned virtual port is a second virtual port, and wherein assigning the second virtual port comprises:

assigning a first virtual port to the packet;

determining that a different virtual port should be assigned to the packet; and assigning the second virtual port to the packet in response to determining that the different virtual port should be assigned to the packet.

16. A method according to claim 15, wherein determining that a different virtual port should be assigned to the packet is based on whether the packet is tagged with a tag including a virtual port identifier.

17. A method according to claim 15, wherein determining that a different virtual port should be assigned to the packet is based on whether the packet should be tunnel terminated.

18. A method according to claim 15, wherein determining that a different virtual port should be assigned to the packet is based on whether the packet corresponds to the Transparent Interconnect of Lots of Links (TRILL) protocol.

19. A method according to claim 15, wherein determining that a different virtual port should be assigned to the packet is based on one or more fields of a header of the packet.

20. A method according to claim 12, wherein the packet processor is configured to determine zero, one, or more physical ports to which the packet is to be forwarded by:

determining zero, one, or more target virtual ports to which the packet is to be forwarded, and for each determined target virtual port, mapping the virtual port to a physical port.

21. A method according to claim 12, wherein determining zero, one, or more physical ports to which the packet is to be forwarded comprises:

determining a primary equal cost multipath (ECMP) virtual port to which the packet is to be forwarded;

determining a secondary ECMP virtual port corresponding to the primary ECMP virtual port; and mapping the secondary ECMP virtual port to a physical port.

22. A method according to claim 12, further comprising:

determining an indicator of a plurality of virtual ports or a plurality of physical ports to which the packet is to be forwarded;

determining whether the indicator corresponds to virtual ports or physical ports;

duplicating the packet using a first packet processing unit in the packet processor if the indicator corresponds to virtual ports; and duplicating the packet using a second packet processing unit in the packet processor if the indicator corresponds to physical ports.

23. A network device, comprising:

a plurality of physical ports;

a packet processor coupled to the plurality of physical ports, the packet processor comprising a plurality of packet processing units including:

a unit configured to assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port;

one or more units configured to assign a virtual domain from a plurality of virtual domains to the packet based on the assigned virtual port, wherein the assigned virtual domain corresponds to a group of virtual ports within the plurality of virtual ports;

one or more downstream units configured to process the packet based on one or more of the assigned virtual port, the assigned virtual domain, and a field of a header of the packet, wherein the one or more downstream units include:

one or more forwarding engines to determine zero, one, or more target virtual ports to which the packet is to be forwarded; and one or more units configured to map one or more target virtual ports to which the packet is to be forwarded to one or more physical ports.

24. A network device according to claim 23, further comprising:
one or more units configured to assign attributes to the packet based on the assigned virtual port and the assigned virtual domain;
wherein the one or more downstream units configured to process the packet are configured to process the packet further based on and the assigned attributes.

25. A network device according to claim 23, wherein the assigned virtual port is a second virtual port, and wherein the unit configured to assign a virtual port is configured to:
assign a first virtual port to the packet,
determine that a different virtual port should be assigned to the packet, and
assign the second virtual port to the packet in response to determining that the different virtual port should be assigned to the packet.

26. A network device, comprising:
a plurality of physical ports;
a packet processor coupled to the plurality of physical ports, wherein the packet processor is configured to:
assign a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port,
assign a virtual domain from a plurality of virtual domains to the packet based on the assigned virtual port, wherein the assigned virtual domain corresponds to a group of virtual ports within the plurality of virtual ports,
determine an indicator of a set of virtual ports or a set of physical ports to which the packet is to be forwarded based on the assigned virtual domain,
determine whether the indicator corresponds to virtual ports or to physical ports,
duplicate, at a first packet processing unit in the packet processor, the packet to the set of virtual ports if the indicator corresponds to virtual ports,
map the set of virtual ports to one or more physical ports if the indicator corresponds to virtual ports,
duplicate, at a second packet processing unit in the packet processor, the packet to the set of physical ports if the indicator corresponds to physical ports, and
transmit the packet via one or more physical ports.

27. A network device according to claim 26, wherein the packet processor is configured to:
utilize the indicator to index a first table to determine the set of virtual ports if the indicator corresponds to virtual ports, and
utilize the indicator to index a second table to determine the set of physical ports if the indicator corresponds to physical ports.

28. A network device according to claim 26, wherein the packet processor is configured to determine whether the indicator corresponds to virtual ports or to physical ports based on comparing a value of the indicator to a threshold value.

29. A network device according to claim 26, wherein indicators of the set of virtual ports are included in a list that also includes an indicator of an index to a group of physical ports, wherein the packet processor is configured to:
duplicate, at the second packet processing unit in the packet processor, the packet to the group of physical ports if the indicator corresponds to virtual ports.

30. A network device according to claim 26, wherein the packet processor is configured to:
map one virtual port in the set of virtual ports to an index to a group of physical ports, and
duplicate, at the second packet processing unit in the packet processor, the packet to the group of physical ports.

31. A packet processing method, comprising:
receiving a packet via a source physical port from a plurality of physical ports;
assigning a virtual port from a plurality of virtual ports to a packet received via one of the physical ports, wherein a quantity of the plurality of virtual ports is larger than a quantity of the plurality of physical ports, and wherein, for each of at least some of the physical ports, multiple virtual ports correspond to one physical port;
assigning a virtual domain from a plurality of virtual domains to the packet based on the assigned virtual port, wherein the assigned virtual domain corresponds to a group of virtual ports within the plurality of virtual ports;
determining an indicator of a set of virtual ports or a set of physical ports to which the packet is to be forwarded based on the assigned virtual domain;
determining whether the indicator corresponds to virtual ports or to physical ports;
duplicating, at a first packet processing unit in a packet processor, the packet to the set of virtual ports if the indicator corresponds to virtual ports;
mapping the set of virtual ports to one or more physical ports if the indicator corresponds to virtual ports;
duplicating, at a second packet processing unit in the packet processor, the packet to the set of physical ports if the indicator corresponds to physical ports; and
transmitting the packet via one or more physical ports.

32. A method according to claim 31, further comprising:
utilizing the indicator to index a first table to determine the set of virtual ports if the indicator corresponds to virtual ports; and
utilizing the indicator to index a second table to determine the set of physical ports if the indicator corresponds to physical ports.

33. A method according to claim 31, wherein determining whether the indicator corresponds to virtual ports or to physical ports includes comparing a value of the indicator to a threshold value.

34. A method according to claim 31, wherein indicators of the set of virtual ports are included in a list that also includes an indicator of an index to a group of physical ports, wherein the method further comprises:
duplicating, at the second pipeline unit in the packet processor, the packet to the group of physical ports if the indicator corresponds to virtual ports.

35. A method according to claim 31, further comprising:
mapping one virtual port in the set of virtual ports to an index to a group of physical ports, and
duplicating, at the second pipeline unit in the packet processor, the packet to the group of physical ports.

36. A network device according to claim 1, wherein the packet processor is a packet processing pipeline.

37. A method according to claim 12, wherein processing the packet with a packet processor includes processing the packet with a packet processing pipeline.

38. A network device according to claim 23, wherein the packet processor is a packet processing pipeline.

39. A network device according to claim 26, wherein the packet processor is a packet processing pipeline.

40. A method according to claim 31, wherein:
duplicating, at a first packet processing unit in a packet processor, the packet to the set of virtual ports if the indicator corresponds to virtual ports includes duplicating, at a first pipeline unit in a packet processing pipeline, the packet to the set of virtual ports if the indicator corresponds to virtual ports; and
duplicating, at a second packet processing unit in the packet processor, the packet to the set of physical ports if the indicator corresponds to physical ports includes duplicating, at a second pipeline unit in the packet processing pipeline, the packet to the set of physical ports if the indicator corresponds to physical ports.

* * * * *